(12) United States Patent
Jacques et al.

(10) Patent No.: US 7,751,208 B2
(45) Date of Patent: Jul. 6, 2010

(54) FORWARD POWER CONVERTER CONTROLLERS

(75) Inventors: Russell Jacques, Withersfield (GB); Paul Ryan, Cambridgeshire (GB); Catriona McKay, Hertfordshire (GB); Devarahandi Indika Mahesh de Silva, Cambridgeshire (GB); David M. Garner, London (GB); Vinod A. Lalithambika, Cambridgeshire (GB)

(73) Assignee: Cambridge Semiconductor Limited (GB)

( * ) Notice: Subject to any disclaimer, the term of this patent is extended or adjusted under 35 U.S.C. 154(b) by 452 days.

(21) Appl. No.: 11/732,140

(22) Filed: Apr. 2, 2007

(65) Prior Publication Data
US 2008/0239762 A1 Oct. 2, 2008

(30) Foreign Application Priority Data
Mar. 30, 2007 (GB) ................... 07062490

(51) Int. Cl.
*H02M 3/335* (2006.01)
(52) U.S. Cl. ................... 363/21.02
(58) Field of Classification Search ............ 363/16–20, 363/21.02–21.04, 21.11, 21.12, 41, 97, 98, 363/131, 132; 323/222, 282–286, 266, 351
See application file for complete search history.

(56) References Cited

U.S. PATENT DOCUMENTS

| | | | | |
|---|---|---|---|---|
| 4,392,474 A | * | 7/1983 | Minner | 123/644 |
| 4,415,959 A | * | 11/1983 | Vinciarelli | 363/21.04 |
| 4,564,800 A | * | 1/1986 | Jurjans | 320/145 |
| 4,688,160 A | | 8/1987 | Fraidlin | |
| 4,783,727 A | | 11/1988 | Neumann | |
| 4,788,634 A | | 11/1988 | Schlecht et al. | |
| 4,888,821 A | | 12/1989 | Hamp, III et al. | |

(Continued)

FOREIGN PATENT DOCUMENTS

EP    0055064 A2    6/1982

(Continued)

OTHER PUBLICATIONS

UK Search Report for GB0706249.0, dated Jun. 7, 2007, 1 page.

(Continued)

*Primary Examiner*—Adolf Berhane
*Assistant Examiner*—Yemane Mehari
(74) *Attorney, Agent, or Firm*—Schwegman, Lunberg & Woessner, P.A.

(57) ABSTRACT

This invention relates to control techniques and controllers for resonant discontinuous forward power converters (RD-FCs).

A controller for a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said controller having a primary sense input to sense a primary winding signal, said primary winding signal representing a voltage across said primary winding or across an additional winding coupled to said primary winding, and wherein said controller is configured to switch on said switch in response to detection of a reduction in a rate of change of said primary winding signal below a threshold, adjacent a substantially minimum value in an operational cycle of said sensed primary winding signal to convey power to said DC output.

53 Claims, 13 Drawing Sheets

U.S. PATENT DOCUMENTS

| | | | |
|---|---|---|---|
| 5,278,748 A | | 1/1994 | Kitajima |
| 5,291,385 A | * | 3/1994 | Vinciarelli ................... 363/20 |
| 5,315,533 A | * | 5/1994 | Stich et al. ................. 700/298 |
| 5,424,933 A | | 6/1995 | Illingworth |
| 5,986,901 A | * | 11/1999 | Weng .......................... 363/44 |
| 5,991,172 A | * | 11/1999 | Jovanovic et al. ........ 363/21.14 |
| 6,205,037 B1 | | 3/2001 | Fitzgerald, Jr. |
| 6,249,444 B1 | * | 6/2001 | Cross ...................... 363/21.03 |
| 6,252,781 B1 | | 6/2001 | Rinne et al. |
| 6,295,214 B1 | | 9/2001 | Matsumoto et al. |
| 6,304,463 B1 | | 10/2001 | Krugly |
| 6,314,010 B1 | | 11/2001 | Markow et al. |
| 6,396,718 B1 | | 5/2002 | Ng et al. |
| 6,469,086 B1 | | 10/2002 | Neu et al. |
| 6,624,522 B2 | | 9/2003 | Standing et al. |
| 6,760,236 B2 | | 7/2004 | Hsieh |
| 7,436,153 B2 | * | 10/2008 | Logsdon ..................... 320/166 |
| 2003/0029559 A1 | | 2/2003 | Yamada et al. |
| 2003/0218258 A1 | | 11/2003 | Charles et al. |
| 2005/0152160 A1 | | 7/2005 | Fung et al. |
| 2005/0270809 A1 | | 12/2005 | Koch |
| 2006/0189113 A1 | | 8/2006 | Vanheusden et al. |
| 2007/0274108 A1 | * | 11/2007 | Jacques et al. ........... 363/21.12 |
| 2008/0037293 A1 | * | 2/2008 | Jacques et al. ........... 363/21.03 |
| 2008/0239761 A1 | * | 10/2008 | Jacques et al. ........... 363/21.02 |
| 2008/0239764 A1 | * | 10/2008 | Jacques et al. ........... 363/21.04 |

FOREIGN PATENT DOCUMENTS

| | | |
|---|---|---|
| EP | 0074399 | 3/1983 |
| GB | 2402005 | 11/2004 |
| JP | 09-182429 | 12/1995 |
| WO | WO-99/19976 A1 | 4/1999 |
| WO | WO 2004/026526 | 4/2004 |
| WO | WO 2005/011908 A1 | 2/2005 |

OTHER PUBLICATIONS

International Application No. PCT/GB2008/050220, Partial International Search Report, 2 pgs.

"UCC38C42 25-Watt Self-Resonant Reset Forward Converter", *Reference Design*, © 2002 Texas Instruments Incorporated,(2002), 10 pgs.

United Kingdom Search Report for Application No. GB0706249.0, dated Oct. 18, 2007, 1 pg.

United Kingdom Search Report for Application No. GB0706246.6, dated Jun. 14, 2007, 1 pg.

United Kingdom Search Report for Application No. GB0706256.5, dated Jun. 14, 2007, 1 pg.

Higashi, T., et al., "Voltage-Mode Resonant Forward Converter With Capacitor-Input Filter", *IEICE Transactions on Communications*, vol. E79-B, No. 1, (1996), 7-44.

Jacques, R., et al., "Forward Power Converter Controllers", U.S. Appl. No. 11/732,108, filed Apr. 2, 2007, 45 pgs.

Jacques, R., et al., "Forward Power Converter Controllers", U.S. Appl. No. 11/732,107, filed Apr. 2, 2007, 32 pgs.

"U.S. Appl. No. 11/732,107, Non-Final Office Action mailed Feb. 18, 2009", 13 pgs.

"International Application Serial No. PCT/GB2008/050222, International Search Report mailed Mar. 25, 2009", 3 pgs.

"International Application Serial No. PCT/GB2008/050221, International Search Report mailed Aug. 22, 2008", 3 pgs.

Spiazzi, G., et al., "A New Soft-Switching Forward DC-DC Converter Operating in Discontinuous Conduction Mode", *Conference Proceedings, 33rd Annual IEEE Power Electronics Specialists Conference (PESC 2002)*, (Cairns, Queensland, Australia, Jun. 23-27, 2002), 1343-1348.

Search Report dated Jul. 17, 2007 from the UK IP Office for Appln. No. GB0706316.7.

"U.S. Appl. No. 11/732,107, Non-Final Office Action mailed Jun. 9, 2009", 7 pgs.

"U.S. Appl. No. 11/732,107, Preliminary Amendment filed Apr. 2, 2007", 3 pgs.

"U.S. Appl. No. 11/732,107, Response filed Nov. 9, 2009 to Non Final Office Action mailed Jun. 9, 2009", 12 pgs.

"U.S. Appl. No. 11/732,107, Response filed May 18, 2009 to Non Final Office Action mailed Feb. 18, 2009", 14 pgs.

"U.S. Appl. No. 11/732,108, Non-Final Office Action mailed Jun. 22, 2009", 13 pgs.

* cited by examiner

FORWARD POWER CONVERTER CONTROLLERS

RELATED APPLICATION

This application claims priority under 35 U.S.C. 119 to United Kingdom Application No. 0706249.0, filed Mar. 30, 2007, which application is incorporated herein by reference and made a part hereof.

FIELD OF THE INVENTION

This invention relates to control techniques and controllers for resonant discontinuous forward power converters (RDFCs).

BACKGROUND TO THE INVENTION

FIG. 1 (which is taken from U.S. Pat. No. 4,688,160) shows an example of a forward power converter comprising a dc input 101, 102 coupled to the primary winding 109 of a transformer 110. The primary winding 109 is connected in series with a switching device 105, here a bipolar transistor, which switches on and off, during an on period building up magnetising flux in the primary winding 109, which drives a current in a secondary winding 111 of the transformer. Unlike a so-called flyback converter, in a forward converter the primary and secondary windings have matched polarities, as indicated by the dots on the windings in FIG. 1. The output from the transformer 110 is rectified by a rectifier 114 and smoothed by a smoothing capacitor 119 to provide a dc output 121, 122. When switch 105 is off the core of the transformer is "reset" allowing the magnetising flux to return to its initial state. In the example of FIG. 1 (U.S. Pat. No. 4,688,160) this is performed by resonant action between the magnetising inductance of transformer 110 and a capacitor 113 shunting diode 114, returning energy to the input voltage source.

The circuit of FIG. 1 includes a large output choke 117 between rectifier 114 and smoothing capacitor 119, and a freewheeling or "flyback" diode 115 across the series combination of choke 117 and smoothing capacitor 119. This is because when the switch 105 is turned off, because the primary and secondary windings have the same sense, rectifier 114 immediately becomes non-conducting. The function of the freewheeling diode 115 is to allow the choke 117 to maintain a continuous output current into output node "X" when switch 105 is off by providing a path for this current.

FIG. 1 shows a conventional, continuous forward converter. There are many other prior art documents describing such converters, including, for example, U.S. Pat. No. 4,415,959; U.S. Pat. No. 6,760,236; U.S. Pat. No. 6,304,463; U.S. Pat. No. 6,252,781; EP0 074 399; and the reference design SLUA276 for the Texas Instruments UCC38C42. In some of these later circuits the secondary side diodes are replaced by synchronous rectifiers embodied in MOS transistors. Other background prior art can be found in U.S. Pat. No. 4,788,634 which describes a resonant forward converter in which natural self-inductance of the transformer in parallel with the transformer provides a resonant "ring" so that the switching circuit can be self-resonant; and US 2005/0270809 (WO 2004/057745) which describes use of an auxiliary transformer in a current limiting circuit.

We have previously described, in our earlier patent applications GB0610422.8 filed 26 May 2006 and U.S. Ser. No. 11/449,486 filed 8 Jun. 2006, how improved operation such as improved regulation and start-up may be achieved by use of switch control in a discontinuous current flow mode.

We now describe further control techniques for RDFCs.

SUMMARY OF THE INVENTION

The present invention provides a controller for a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said controller having a primary sense input to sense a primary winding signal, said primary winding signal representing a voltage across said primary winding or across an additional winding coupled to said primary winding, and wherein said controller is configured to switch on said switch in response to detection of a reduction in a rate of change of said primary winding signal below a threshold, adjacent a substantially minimum value in an operational cycle of said sensed primary winding signal to convey power to said DC output.

By switching the switch in response to detection of a reduction in a rate of a change of the primary winding signal below a threshold, adjacent a substantially minimum value in an operational cycle of the sensed primary winding signal, the controller achieves improved EMI and energy loss performance. Furthermore, since the resonance of the voltage across the primary or auxiliary winding is dependent on a number of parameters, including inter alia, value and tolerance of the main components, effect of the load current and the leakage conductance, the length of the on-time of the switch, a more reliable operation of the RDFC is achievable.

Preferably the controller comprises a rate of change detector to detect said rate of change reduction, said rate of change detector comprising: a trailing portion detector configured to output a trailing portion signal representing a period of said sensed primary winding signal during which said sensed primary winding signal has a first rate of change whose magnitude is greater than a first threshold value; and wherein said rate of change detector is configured to output a switch enable signal representing a period after said trailing portion signal in which said sensed primary winding signal is adjacent a minimum value.

Preferably the rate of change detector further comprises a leading portion signal representing a period of said sensed primary winding signal during which said sensed primary winding signal has a second rate of change that is greater than a second threshold value; wherein said rate of change detector is configured to output a switch enable signal representing a period after said trailing portion signal and a following leading portion signal in which said sensed primary winding signal is adjacent a minimum value.

Preferably the controller is configured to hold said leading portion signal at a value said leading portion signal has during said period when said second rate of change is greater than said second threshold value for a period extending beyond a time when said second rate of change has fallen below said second threshold value.

Preferably the controller is configured to disable said trailing portion signal or said leading portion signal, for an extension period substantially immediately following said period during which said first rate of change is greater than said first threshold value.

Preferably an extension of a said trailing portion or leading portion signal is dependent on a resonance period of the RDFC. Alternatively, the extension of said trailing or leading portion signal may be pre-set.

Preferably the controller is configured to not detect transitions in said trailing portion signal for a first period substantially immediately following a first event associated with said switch being switched off, and wherein said first period is dependent on a resonance period of said RDFC. Alternatively, the first period may be pre-set.

Preferably the controller is configured to not detect transitions in said trailing portion signal for a second period substantially immediately following said period during which said first rate of change of said sensed primary winding signal is greater than said first threshold value, said second period being dependent on a resonance period of said DFC. Alternatively, the second period may be pre-set.

Preferably the controller further comprises a resonance period detector for determining a resonance period of said RDFC from said sensed primary winding signal, said resonance period detector determining a maximum on duration for said switch, said resonance period detector comprising: a first event detector configured to detect a first event associated with said switch being switched off; a second event detector configured to detect a second later event following said switch being switched off; wherein said resonance period detector is configured to output a signal representing a duration between said first event and said second event.

Preferably, the first event comprises an edge of a signal representing said switch being turned off. Alternatively, said first event comprises a start of a leading portion signal, said leading portion signal representing a period of said sensed primary winding signal during which a rate of change of said sensed primary winding signal is greater than a second threshold value.

Preferably, said second event comprises an end of a trailing portion signal, said trailing portion signal representing a period of said sensed primary winding signal during which a rate of change of said sensed primary winding signal is greater than a first threshold value.

Preferably the controller is configured to not detect transitions in said trailing portion signal for a first period substantially immediately following said first event, and wherein said first period is dependent on a resonance period of said RDFC. Alternatively, the first period may be pre-set.

Preferably the controller is configured to not detect transitions in said trailing portion signal for a second period substantially immediately following said period during which said rate of change of said sensed primary winding signal is greater than said first threshold value, said second period being dependent on a resonance period of said RDFC. Alternatively, the second period may be pre-set.

Preferably, the resonance period determines a maximum on-duration of said switch.

Preferably the controller is configured to control one or both of an on and off duration of said switch in response to a loading condition of said RDFC.

Preferably the primary sense input is coupled to said primary or additional winding via a capacitor to sense a voltage in said primary or additional winding.

Preferably, said capacitor supports a resonant operation of said RDFC.

The present invention provides a resonant discontinuous forward power converter (RDFC) comprising a controller according to the above statements.

The present invention also provides a method of controlling a resonant discontinuous forward converter (RDFC), said converter including: a transformer with primary and secondary matched polarity windings and a switch to in operation, cyclically switch DC power to said primary winding of said transformer, said converter further having a DC output coupled to said secondary winding of said converter, said method comprising: sensing a primary winding signal, said primary signal representing a voltage across said primary winding or across an additional winding coupled to said primary winding; detecting a reduction in a rate of change of said primary winding signal below a threshold, adjacent a substantially minimum value in an operational cycle of said sensed primary winding signal; and switching on said switch in response to said detection to convey power to said DC output.

Preferably, detecting comprises detecting a trailing portion of said sensed primary winding signal for a said operational cycle; detecting a portion of said operational cycle of said sensed primary winding signal following said detected trailing portion of said sensed primary winding signal in which said sensed primary winding signal has a rate of change of said primary winding signal below a threshold, adjacent a substantially minimum value; and generating a switch enable signal in response to said detection, said switch enable signal enabling switching on of said switch.

Preferably detecting said trailing portion of said sensed primary winding signal for a said operational cycle comprises: comparing a rate of change of said primary winding signal against a first threshold value; and generating a trailing portion signal that represents a period of said sensed primary winding signal during which said first rate of change of said sensed primary winding signal is greater than said first threshold value.

Preferably, the detecting of a reduction in a rate of change of said primary winding signal below a threshold, adjacent a substantially minimum value of an operation cycle of said primary winding signal comprises: detecting a leading portion of said sensed primary winding signal for a said operational cycle; detecting a portion of said operation cycle of said sensed primary winding signal following said detected trailing portion and a following leading portion of said sensed primary winding signal in which said sensed primary winding signal has a rate of change of said primary winding signal below a threshold, adjacent a substantially minimum value.

Preferably, detecting said leading portion of said sensed primary winding signal for a said operational cycle comprises: comparing a rate of change of said sensed primary winding signal against a second threshold value; and generating a leading portion signal that represents a period of said sensed primary winding signal during which said second rate of change of said sensed primary winding signal is greater than said second threshold value.

Preferably, a value that said leading portion signal has during said period when said second rate of change is greater than said second threshold value is held at said value for a period extending beyond a time when said second rate of change has fallen below said threshold value.

Preferably, the trailing portion signal and the leading portion signals are disabled for an extension period substantially immediately following said period during which said first rate of change is greater than said first threshold value. Preferably, a length of said extension periods is dependent on the resonance period of the RDFC. Alternatively, the length of the extension periods is pre-set.

Preferably, transitions in said trailing portion signal are not detected for a first period substantially immediately following a first event associated with said switch being switched off, and wherein said first period is dependent on a resonance period of said RDFC. Alternatively, the first period may be pre-set.

Preferably, transitions in said trailing period signal are not detected for a second period substantially immediately following said period during which said first rate of change of said sensed primary winding signal is greater than said first threshold value, said second period being dependent on a resonance period of said RDFC. Alternatively said second period may be pre-set.

Preferably the method further comprises determining a resonance period of said RDFC from said sensed primary winding signal, said resonance period determining a maximum on duration of said switch.

Preferably, the method further comprises determining a resonance period of said RDFC from said sensed primary winding signal comprises: detecting a first event associated with said switch being switched off; detecting a second later event following said switch being switched off; and generating a resonance period signal representing a duration between said first event and said second event.

Preferably, the first event comprises an edge of a signal representing said switch being turned off. Alternatively, said first event comprises a start of a leading portion, said leading portion representing a period of said sensed primary winding signal during which a second rate of change of said sensed primary winding signal is greater than a second threshold value.

Preferably said second event comprises an end of a trailing portion signal, said trailing portion signal representing a period of said sensed primary winding signal during which a first rate of change of said sensed primary winding signal is greater than a first threshold value.

Preferably transitions in said trailing portion signal are not detected for a first period substantially immediately following said first event, and wherein said first period is dependent on a resonance period of said RDFC. Alternatively, said first period may be pre-set.

Preferably, transitions in said trailing portion signal are not detected for a second period substantially immediately following said period during which said rate of change of said sensed primary winding signal is greater than said first threshold value, and wherein said second period is dependent on a resonance period of said RDFC. Alternatively, the second period may be pre-set.

Preferably, one or both of an on and off duration of said switch is controlled in response to a loading condition of said RDFC. Preferably, in a maximum power loading condition, said on duration is substantially maximised and said off duration is substantially minimised.

Preferably, in a medium power loading condition, said on duration is reduced from a maximum on duration and said off duration is substantially minimised. Preferably, in a low power loading condition, said on-duration is substantially minimised and an off duration is increased from a minimum duration.

The present invention further provides a method of determining a resonance period of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said controller having a primary sense input to sense a primary winding signal, said primary winding signal representing a voltage across said primary winding, or across all additional winding coupled to said primary winding, said method comprising: detecting a first event associated with said switch being switched off; detecting a second later event following said switching being switched off; and generating a resonance period signal representing a duration between said first event and said second event, wherein said resonance period determines a maximum on duration of said switch.

Preferably said first event comprises an edge of a signal representing said switch being turned off. Alternatively, said first event comprises a start of a leading portion signal, said leading portion signal representing a period of said sensed primary winding signal during which a second rate of change of said sensed primary winding signal is greater than a second threshold value.

Preferably, said second event comprises an end of a trailing portion signal, said trailing portion signal representing a period of said sensed primary winding signal during which a first rate of change of said sensed primary winding signal is greater than a first threshold value.

Preferably transitions in said falling signal are not detected for a first period substantially immediately following said first event, and wherein said first period is dependent on a resonance period of said RDFC. Alternatively, the first period may be pre-set.

Preferably, transitions in said trailing portion signal are not detected for a second period substantially immediately following said first rate of change of said sensed primary winding signal being greater than said first threshold value, said second period being dependent on a resonance period of said RDFC. Alternatively, the second period may be pre-set.

The present invention also provides a controller for a resonant discontinuous forward converter (RDFC), said converter including a transformer with primary and secondary matched polarity windings and a switch to, in operation, cyclically switch DC power to said primary winding of said transformer said converter further having a DC output coupled to said secondary winding of said converter, said controller having: a primary sense input to sense a primary winding signal, said primary winding signal representing a voltage across said primary winding or across an additional winding coupled to said primary winding; means for detecting a first evening associated with said switch being switched off; means for detecting a second later event following said switch being switched off; and means for generating a resonance period signal representing a duration between said first event and said second event, and wherein said resonance period determines a maximum on duration of said switch.

The present invention also provides a controller for a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said controller comprising: a primary sense input to sense a primary winding signal, said primary winding signal representing a voltage across said primary winding or across an additional winding coupled to said primary winding, a rate of change detector to detect a rate of change reduction, said rate of change detector comprising: a falling signal detector configured to output a falling signal representing a period of said sensed primary winding signal during which said sensed primary winding signal has a first rate of change whose magnitude is greater than a first threshold value, and a rising signal detector configured to output a rising signal representing a period of said sensed primary winding signal during which said sensed primary winding signal has a second rate of change whose magnitude is greater than a second threshold value, wherein said rate of change detector is configured to output a switch enable signal representing a period after said falling signal and a following rising signal in which said sensed primary winding signal is adjacent a minimum value, and wherein said controller is configured to switch on said switch in response to detection of a reduction in a rate of change of said primary winding signal below a threshold, adjacent substantially minimum value in an operational cycle of said sensed primary winding signal to convey power to said DC output.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
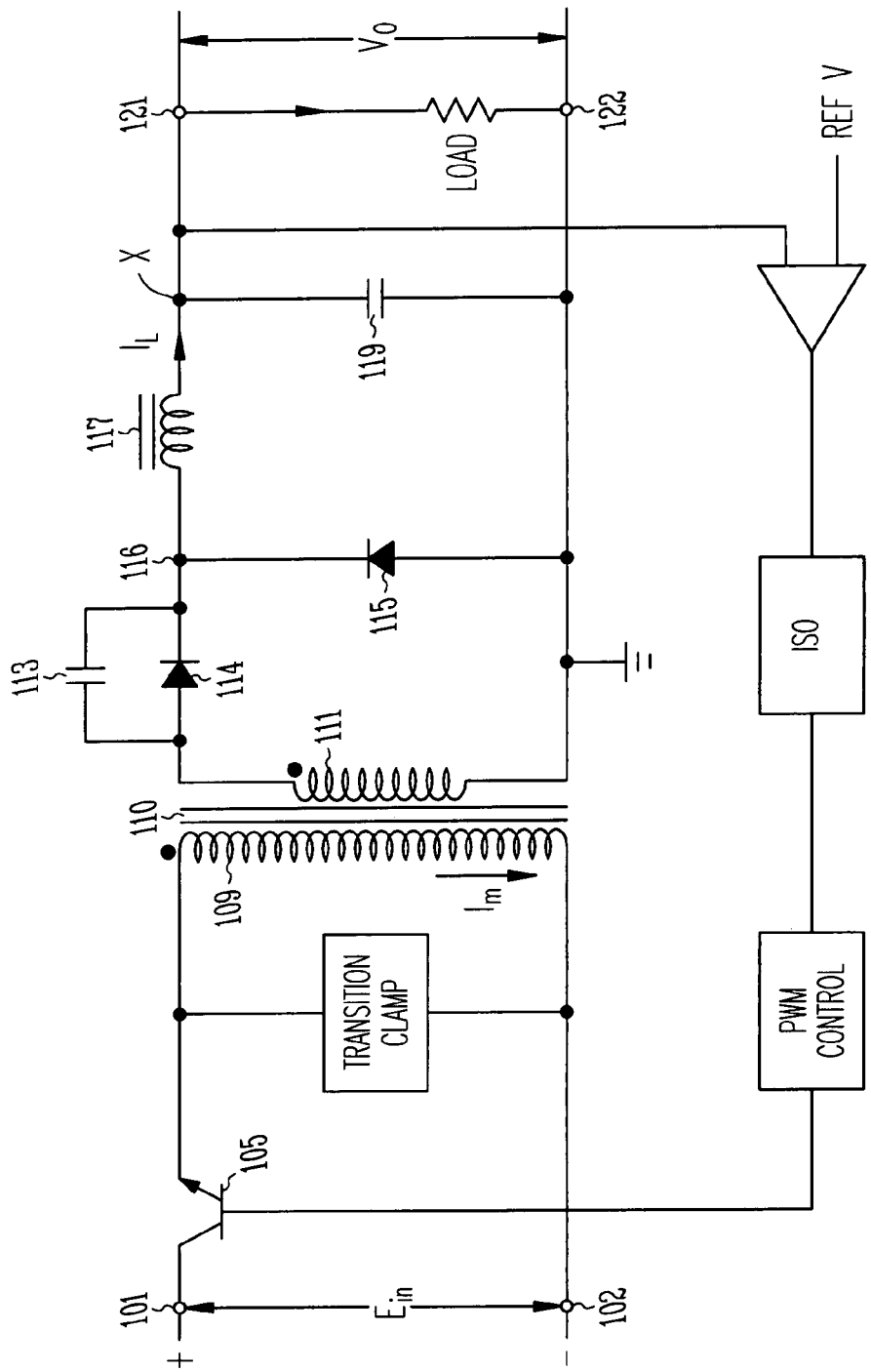
FIG. 1 shows an example of a forward converter according to the prior art.

In this specification we are concerned with controlling resonant discontinuous forward converters. In an exemplary RDFC power to a primary or input winding of a transformer is switched and a secondary or output winding of the transformer, with a polarity matched to that of the primary winding, is coupled to a rectifier which provides dc power to a smoothing capacitor, dc power being supplied by the RDFC to its output from this connection node X. A voltage waveform on the secondary winding of the transformer has a first portion during which the switch is on and current flows into the output connection node X, and second substantially resonant portion during which both the switch and the rectifier are off. Substantially no current flows into the connection node (other than from the smoothing capacitor) during the second portion of the voltage waveform.

In the designs we describe a connection between the rectifier and the connection node may include a small inductor (for example less than 5% of the primary side magnetising inductance) but substantially no current flows in this inductance during the second, resonant portion of the waveform and there is no need for a large choke of the type used in a continuous forward converter. There is no need connect a capacitor across the rectifier to achieve resonance; other connection positions are possible, for example, across a primary, secondary or auxiliary winding of the transformer. More particularly in embodiments we use the magnetising inductance of the transformer with an added capacitor on the primary side to achieve resonance in the off cycle.

In some preferred implementations the RDFC is configured for AC-DC power conversion and thus includes an AC-DC converter such as a bridge rectifier on the primary side. In some particularly preferred implementations the RDFC is mains-powered and the primary side is powered by a high dc voltage (for example greater than 70Vdc, 100Vdc, 150Vdc or 200Vdc) whilst the secondary side dc voltage is low (for example, less than 20Vdc or 10Vdc). In embodiments we preferably employ minimum voltage switching on the primary side (i.e. a primary side switch is turned on at a time when a voltage across the switch is minimum and, more preferably, close to zero volts).

We have previously described techniques for implementing a resonant discontinuous forward converter (RDFC) which employ a control system to turn a power switch of the RDFC on and off in a controlled manner. As previously described, the control system may operate in an uncontrolled, fixed frequency mode or the control system may sense from one or more inputs and decide when to turn the power switch on and off responsive to this sensing, for example to implement pulse width and/or frequency modulation. This facilitates regulation of the RDFC which, in detail, may be performed using a range of algorithms. One technique uses the control system to operate the RDFC to compensate for circuit variables and to operate in a minimum voltage switching mode. The converter may also control the switching frequency during start-up and/or current limit in order to protect the power switch and increase the energy transferred to the load. The control system is preferably implemented using a control IC (integrated circuit).

As mentioned above, the RDFC operates without a freewheeling or flyback diode, and with or without an output inductor. However, if present the output inductor is sufficiently small to ensure that the forward converter operates in a discontinuous mode and substantially resonantly that is at or close to resonance.

Within an RDFC, the timing of the primary power switch has to be: in accordance with the resonance of the isolating transformer and other components forming part of the resonating circuit; managed to control the power transfer to the output; and appropriate to the other components (particularly the transformer) so they operate without excessive stress and within an efficient range.

Timing is set by a controller, which determines the time to turn the primary switch on and how long to leave it on. Issues that have to be considered include:

Turn on when the switch voltage is at a minimum to minimise Electromagnetic Interference (EMI) and minimise power loss in the switch during turn-on.

Delay turn-on if the power transfer has to be reduced (extended off-time)

Turn off if primary current is too high

For maximum efficiency of power delivery, the on-time should be maximised subject to working within the efficient range of core flux in the transformer Reduce on-time if lower power delivery is required In practice, the characteristics of the power transfer circuit of the RDFC (switch, transformer and associated components) are subject to tolerance due to manufacturing variation, and effects of temperature, load etc.

Switching can occur using fixed timing, wherein the switch is turned on and off at fixed, timed, events during a resonant cycle. However, the fixed timing has to be set conservatively within the possible operating range of the RDFC. Consequently, the converter is larger and more expensive than is possible if the timing is optimised for the particular set of components. Additionally, due to tolerance of resonant components timing of turn-on will be imprecise in relation to the instant of minimum voltage across the switch.

Embodiments of the present invention, however, use signals derived from resonance of the transformer to optimise the timing of the switch in accordance with the above issues. Factors that can be determined from such signals include: determine the maximum allowable on-time within the capabilities of the transformer core; and determining the times when the switch can be turned on again during the resonance following switch off, to avoid excessive EMI and switching losses.

Figure 2:
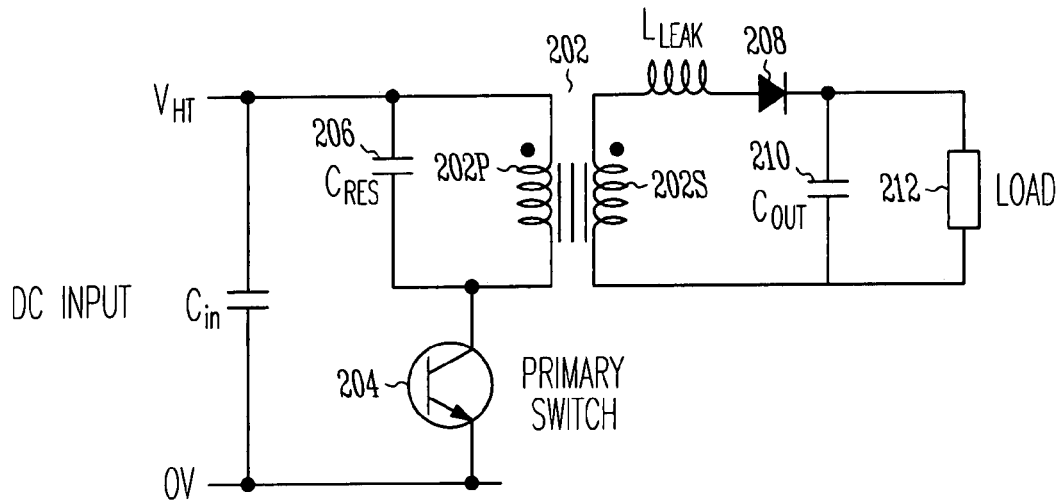
FIG. 2 shows a basic circuit diagram of an RDFC.

FIG. 2 shows a basic arrangement of an RDFC 200, comprising an isolating transformer 202 having primary $202_P$ and secondary $202_S$ windings. A switch 204, when closed, applies a DC voltage $V_{ht}$ across the primary winding of the transformer. Power is delivered to the load 212 via a rectifying diode 208 and smoothing capacitor 210. The polarity of the transformer is such that power is supplied to the output circuit when the primary switch is closed. Inductance $L_{leak}$ may be a discrete component or may be a characteristic of the transformer itself, in which case it can be modelled as an inductor in either the primary circuit or the secondary circuit, or both. The magnitude of $L_{leak}$ affects the behaviour and performance of the converter. For applications requiring more stable voltage regulation $L_{leak}$ is normally lower in value; for applications requiring a higher converter output impedance (such as battery chargers), its value is set higher.

Figure 3A:
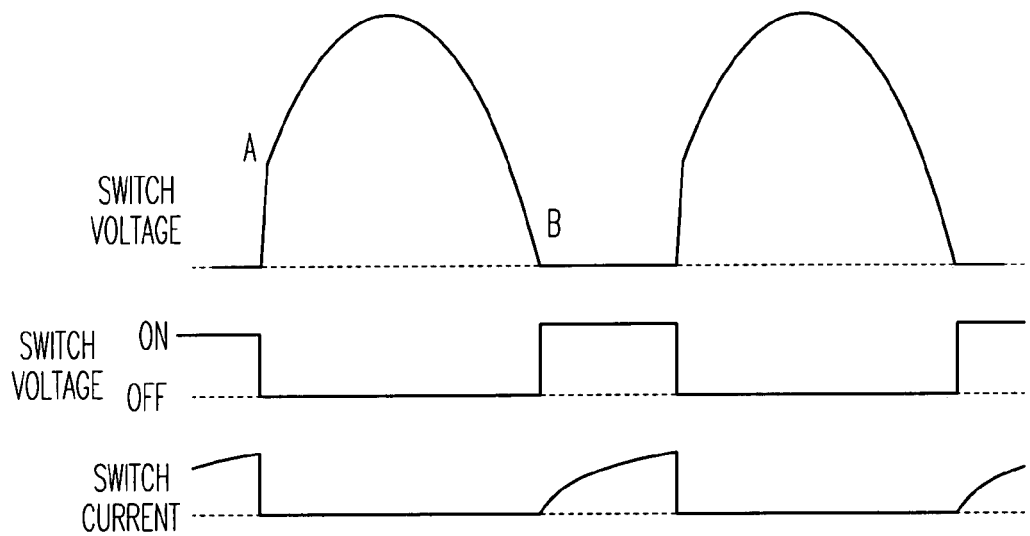
FIGS. 3a, 3b, 3c, 3d and 3e show example waveforms of converter operation.

Example waveforms of converter operation are shown in FIG. 3a. When switch 204 is in the On state, current flows through the switch and transformer primary. The current rises in accordance with load conditions and the effect of $L_{leak}$. At switch-off, the voltage rises rapidly (reflected load current in $L_{leak}$) to point "A". Once energy has been transferred out of the leakage inductance, the circuit resonates as the combination of $C_{res}$ 206 and the magnetising inductance of the transformer $L_{mag}$, and other stray reactances. During resonance, the switch voltage reaches a peak then reduces. Depending on circuit values and conditions, it may reach 0V ("B"). Depending on the characteristics of circuit components, the switch voltage may be prevented from resonating below 0V either by diodes associated with the switch, or by the effect of the output diode and voltage on the output capacitor.

Figure 3B:
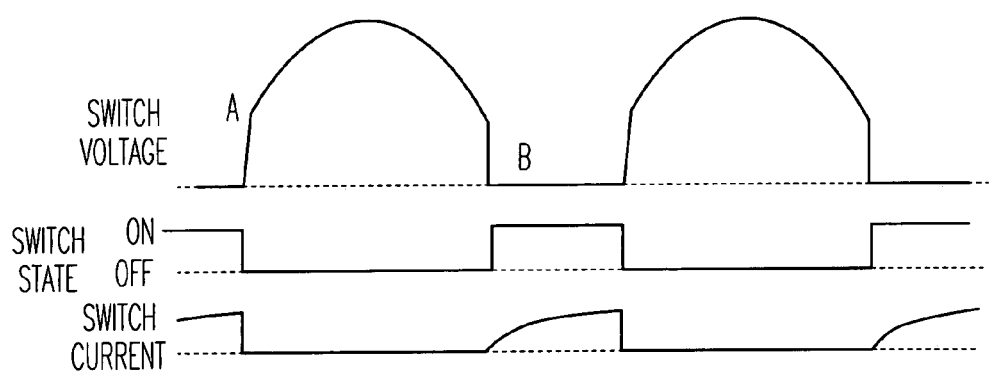
Figure 3C:
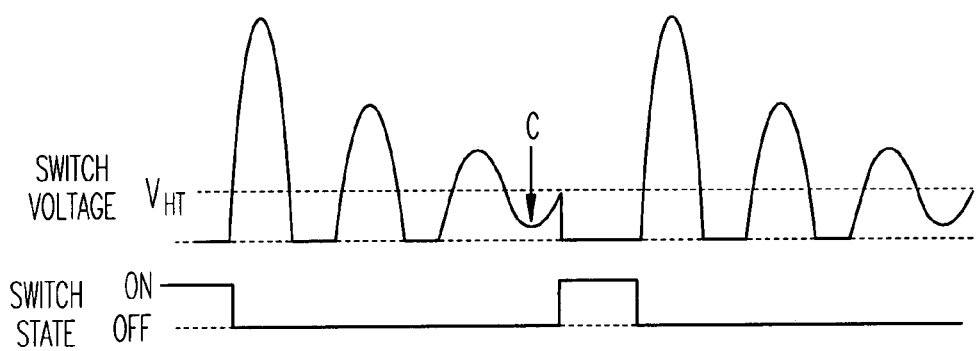

FIG. 3a shows the switch being turned on at point "B". FIG. 3b shows example waveforms of the switch being turned on before the resonant waveform reaches point "B", and FIG. 3c (on a longer time axis) shows the switch being turned on later than point "B". In FIG. 3c, the switch waveform can be seen to oscillate as a damped sinewave around $V_{ht}$. Switching. Optimum power transfer is achieved by turning the switch on again at point "B".

It is preferable to adjust one or both of an on-time of the switch and an off-time of the switch to control the power transfer. However, the turn-on instant of the switch is preferably chosen to correspond to region of the switch voltage in which a rate of change of the switch voltage is below a threshold, adjacent a substantially minimum value of the switch voltage.

In FIG. 3b, the switch is turned on early relative to the return of the switch voltage to 0V. This has two undesirable effects:
Inefficiency, as the energy stored in $C_{res}$ at turn-on is dissipated in the switch as heat; and
EMI caused by the fast change of the voltage across the switch Preferably, the switch is turned on when the switch voltage is close to 0V ("B" in FIG. 3a). For situations where there is an extended off-time (as shown, for example in FIG. 3c), it is preferable to turn the switch back on when the resonant voltage is at an instant of minimum voltage (e.g. "C" in FIG. 3c); this reduces EMI and energy loss.

It is therefore clear that care must be taken in choosing the turn-on time even when the converter is operating in maximum power mode (FIG. 3a). Since the resonance of the voltage is centred around $V_{ht}$, the timing of the point "B" depends on, for example:
Value and tolerance of the main components ($C_{res}$, $L_{mag}$)
Effect of load current and $L_{leak}$
Length of on-time (since this affects the peak resonance voltage—via the energy in $L_{mag}$)
Value of $V_{ht}$
Any voltage drop across the switch during the on-time
Effect of minor circuit parameters (switch capacitance, winding capacitance etc.)

The timing changes not only with component tolerance but also with load conditions, which can change rapidly during converter operation. It is therefore preferable that an optimum switch on time is determined such that optimum power is transferred to the load, power losses are minimised and to avoid unwanted EMI.

Figure 3D:
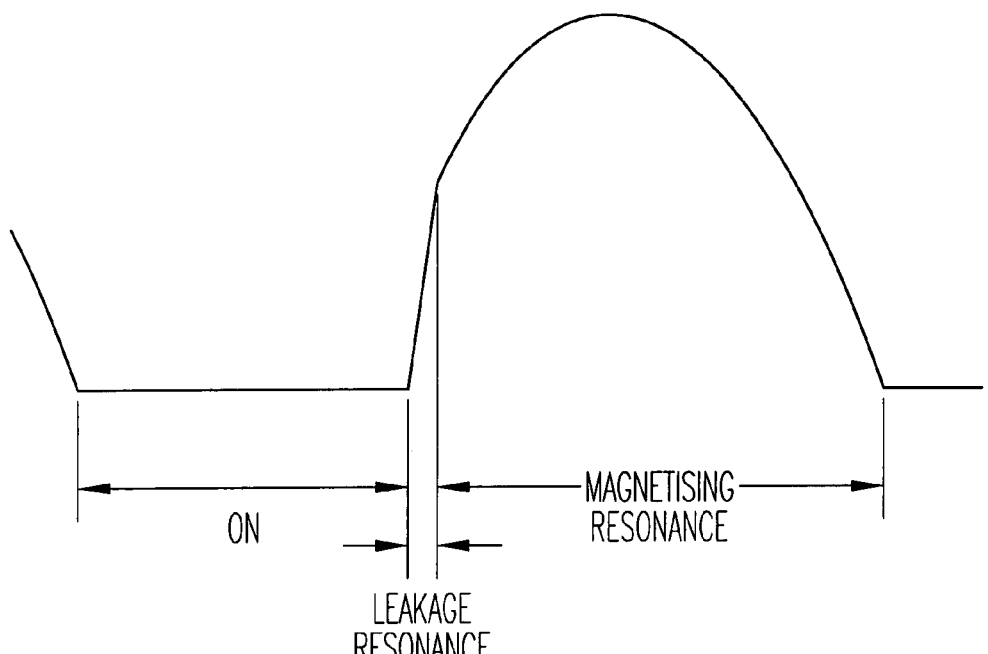

Apart from component values and parameters, the resonant waveforms observed in an RDFC vary according to load and switching conditions. FIG. 3d is a more detailed view of the waveform shown in FIG. 3a and shows the main parts of the observed resonance wave. The polarity represents the voltage across the power switch assuming a positive supply to the transformer primary and the power switch is connected in the other connection of the primary to the negative supply.

The three main parts are:
On-period: when the power switch is turned on, connecting the transformer primary to the power source. Voltage across the switch is low. During this period current flow is principally reflected secondary (load-related) current and magnetising current rising according to the primary inductance and supply voltage etc.

Leakage resonance: In this period, current continues to flow in the secondary. The primary voltage is a (fast) resonance of the leakage inductance with the resonant capacitance. The magnitude of this resonant voltage depends on the current at turn-off and the leakage inductance. The former is typically mostly the reflected secondary current; but there may be a small contribution from magnetising current, depending on circuit parameters. Typically, this resonance is fast and the turn-off time of the switch may be significant so the exact waveform is complex.

Magnetising resonance: Once the secondary current has substantially decayed, the wave results from resonance of the magnetising (primary) inductance and the resonant capacitance. The amplitude depends on the magnetising current at the end of the on-period which depends on the magnetising current at the beginning of the on-period, the supply voltage and the duration of the on-period etc.

As load and switching conditions vary, the principal effects are:
Amplitude and duration of the leakage resonance increases with the sum of reflected load current and magnetising current. These scale according also to the magnitude of the leakage inductance.
Amplitude of the magnetising resonance increases with on-period and supply voltage. Duration of the magnetising resonance depends on the magnetising current remaining at the end of the leakage resonance and the voltage at that time.

Figure 3E:
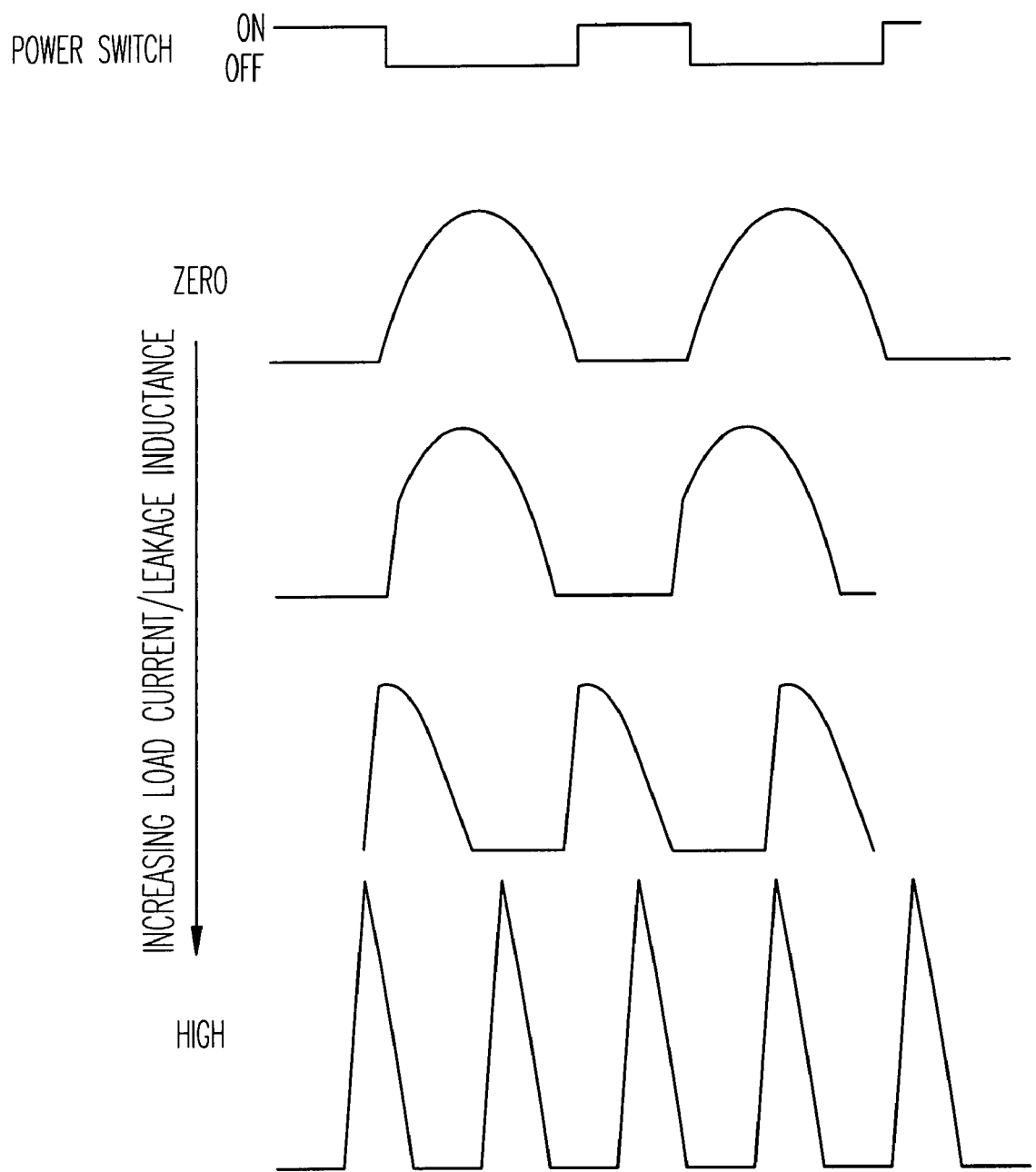

Typical waveforms are illustrated in FIG. 3e; all correspond to the condition where the on-period commences immediately the switch voltage reaches a minimum. Though the on-time and reflected secondary current are not necessarily dependent, in typical applications the on-period is shortened when the secondary current is high in overload.

Figure 4:
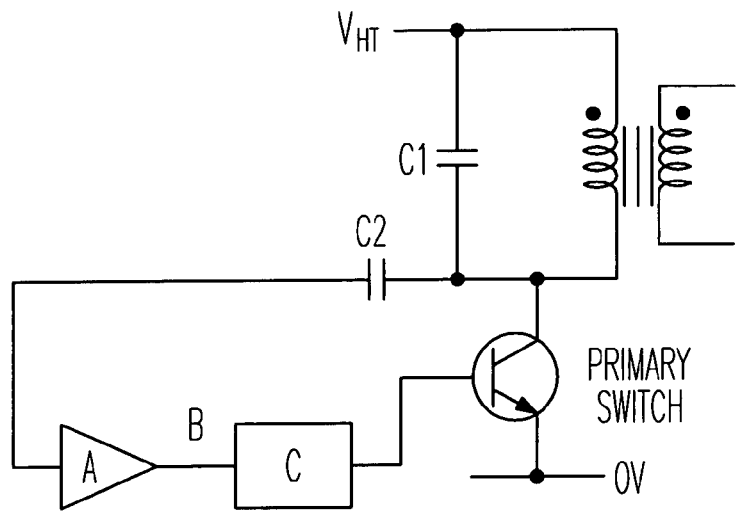
FIG. 4 shows part of a primary-side circuit for controlling a converter switch.

FIG. 4 shows part of a primary-side circuit for controlling the switch in response to the resonance. Module A receives current from capacitor C2; its input is arranged to have a substantially low impedance so that current is substantially proportional to the rate of change of voltage across the switching transistor. Module A derives signal(s) B from its input current and these are used by module C to control switching on and off of the transistor. Preferably, module A includes comparators so the signals B are digital. Preferable, signals B comprise two signals, one representing "rising" switch voltage and the other "falling" switch voltage. However, to minimise cost, a system is envisaged where only the "falling" condition is detected and resonance timing is derived from this signal in relation to the switch control signal(s).

Figure 5:
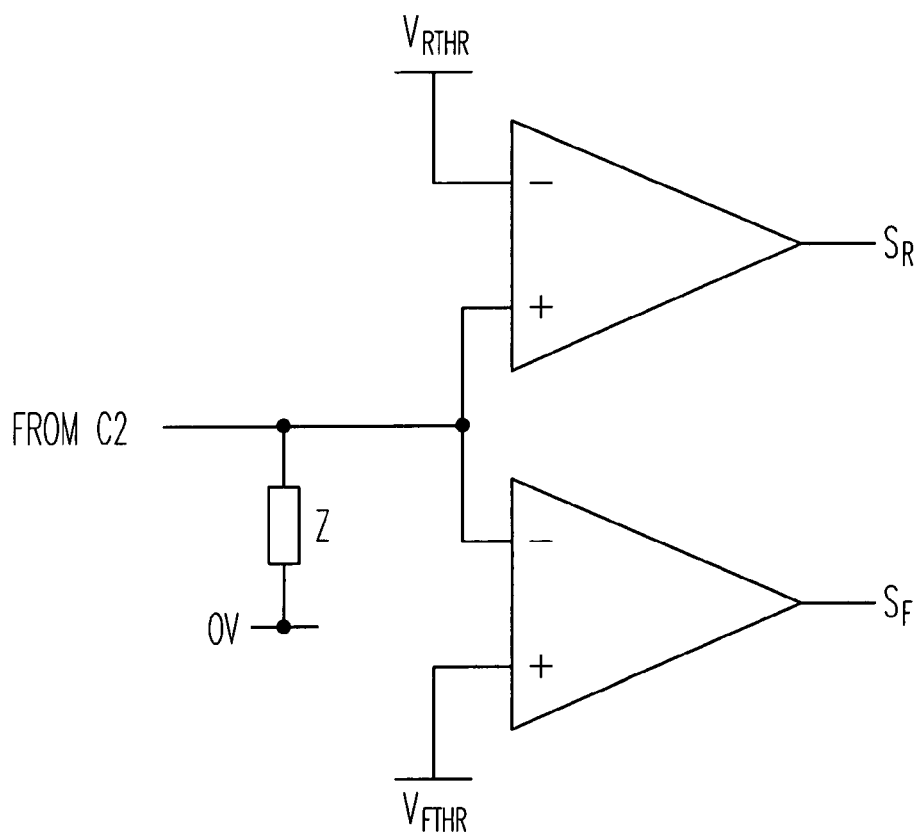
FIG. 5 shows an example implementation of a rising and falling detector for the circuit of FIG. 4.

FIG. 5 shows an example implementation of a circuit to derive the rising and falling switch voltages. Module A comprises a pair of voltage comparators and an impedance (Z). Other arrangements will be known to those skilled in the art.

Figure 6:
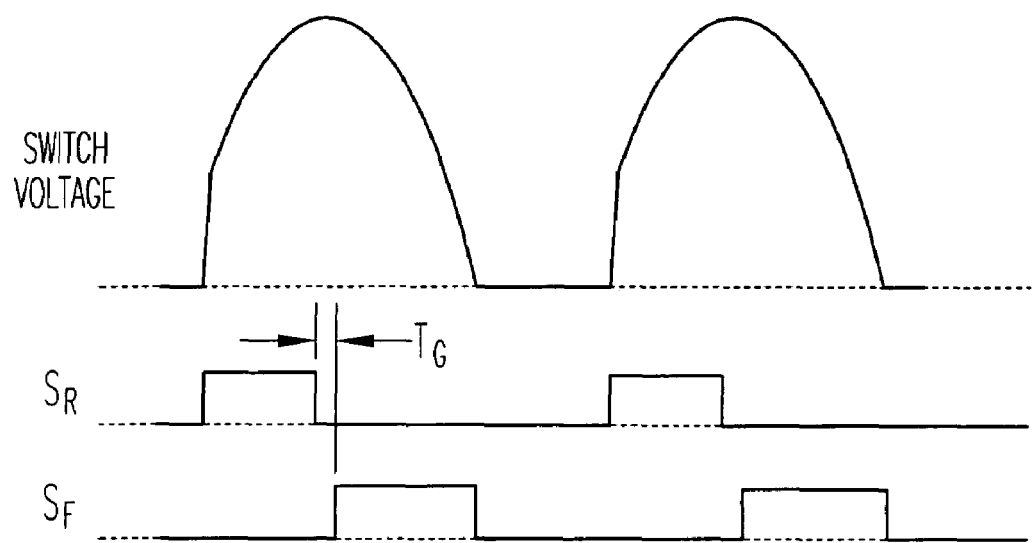
FIG. 6 shows example signals derived from the circuit of FIG. 5.

FIG. 6 shows example signals derived from the circuit of FIG. 5. The "rising" signal ($S_r$) becomes active where the rate of change of voltage is greater than a rising threshold, and goes inactive when the rate of change of voltage is less than a rising threshold. The threshold is determined by the sensitivity of the Module A and the value of the coupling capacitor:

$$\frac{dV}{dt} = C2 \frac{Vrth}{Z}$$

Likewise, the "falling" signal ($S_f$) becomes active when the rate of change of switch voltage goes beyond:

$$\frac{dV}{dt} = C2 \frac{Vfth}{Z}$$

The falling signal becomes inactive when the rate of change substantially goes to zero as the switch voltage returns to 0V. As shown in FIG. 6, a gap $T_g$ between the falling edge of the $S_r$ and the rising edge of $S_f$ may occur as a result of the threshold levels.

FIG. 7 illustrates other possible effects as a result of the threshold levels. Signals $S_f$ and $S_r$, derived using capacitive coupling, are sensitive to noise and high frequency components of the resonance signal. Typically, this manifests as multiple transitions at the leading and trailing edges of $S_r$ and $S_f$.

Figure 7A:
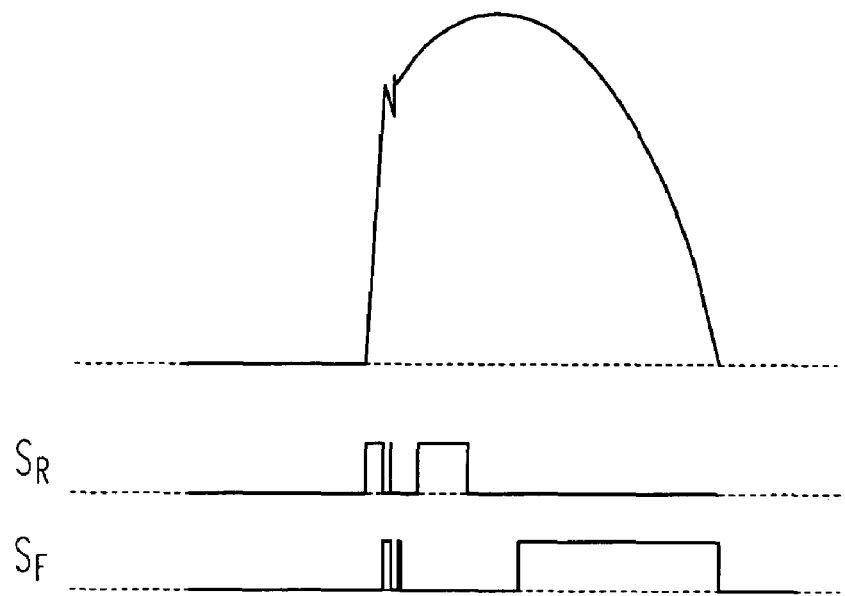
FIGS. 7a, 7b, 7c, 7d and 7e show example output signals from the circuit of FIG. 5.

FIG. 7a: shows the effect of resonance of the leakage and other stray inductance immediately after switch-off.

Figure 7B:
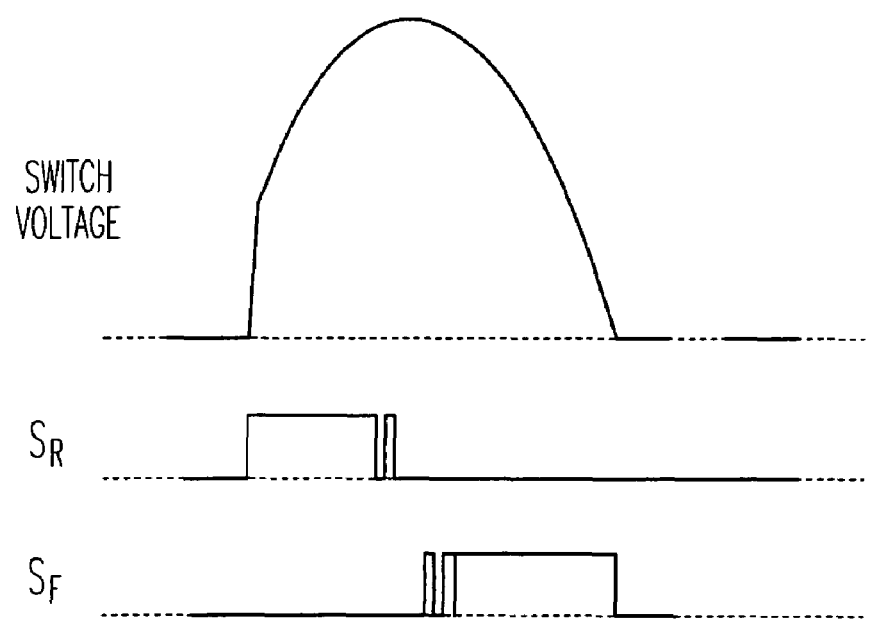

FIG. 7b: shows that, as the dV/dt reduces, noise on the switch voltage can cause multiple transitions as the rate crosses the effective threshold rate.

Figure 7C:
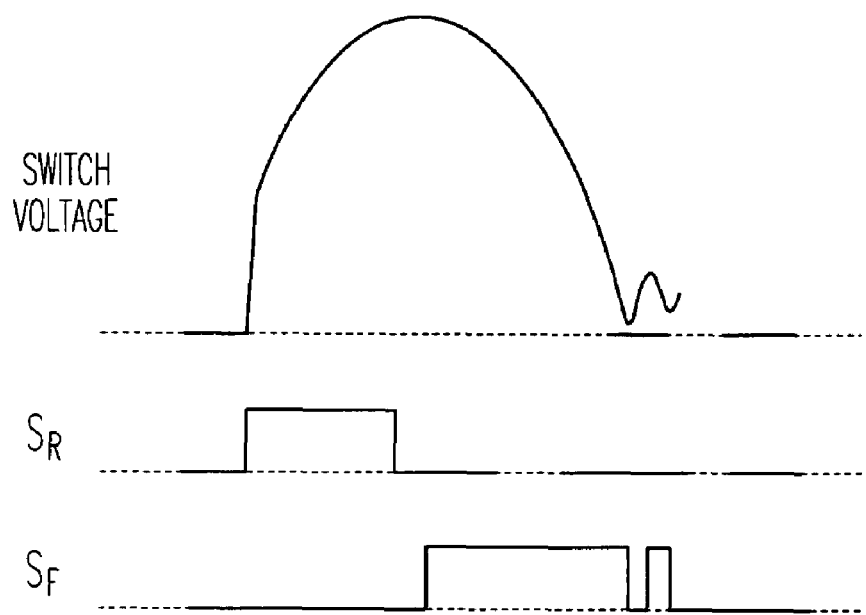

FIG. 7c: shows that, when the resonance becomes clamped by the output circuit, faster resonances can occur in the primary circuit due to leakage and other stray inductance.

For correct operation of the RDFC, it is preferable for the controller to choose the correct time to turn on the primary switch and the maximum time the switch can remain on before switching it off.

Such signals may be derived from Signals B, and, more preferably, from $S_r$ and $S_f$. However, as shown in FIGS. 6 and 7a to 7c, $S_r$ and $S_f$ may have multiple transitions at their leading and trailing edges, it is desirable to process the signals further to avoid undesirable effects, such as excessive on-time, leading to core saturation or switch over-voltage stress during resonance; and excessive EMI, caused by turn-on when the switch voltage is high.

It is preferable to process the $S_r$ and $S_f$ signals to give two intermediate results:

a) A pulse signal representing the estimated resonance time, and b) A pulse signal indicating when it is appropriate to turn the switch on again and other times when it is not.

FIG. 8 illustrates such signals in the condition where the off-time has been extended beyond the first resonance after switch-off. Signal ResEndSig represents a period during which the switch may be switched on (high) and when it is should not (low), if EMI is to be avoided. Signal ResEstSig delineates the first resonance after switch-off. The period when it is high (ResEstTime) represents the resonant period and is characteristic of the resonant system and can be used to determine the maximum on-time.

In a particular converter, the maximum allowable on-time is dependent on many factors, including:
  Maximum input voltage
  Transformer core type and winding inductance
  Total resonating capacitance, including that of the transformer and switch
  Magnitude of any core flux remaining after resonance (or otherwise) from the previous cycle
  Load current, and hence the voltage increase at turn-off due to leakage inductance energy In applications where the power transfer is varied by changing the on-time and off-time of the primary switch, at least three operational modes to manage power are identifiable:
  Maximum power (Maximum on-time and minimum off-time)
  Medium power (Reduced on-time and minimum off-time)
  Low power (Minimum on-time and extended off-time)

Preferably, the on-time is reduced before increasing off-time. Reducing the on-time minimises transformer losses, EMI and audible noise, as the core flux is reduced (consequence of reducing on-time). Minimising the off-time allows the on-time to be maximised at medium and high powers, whilst staying within allowable core flux, as this maximises the reverse magnetising current from the previous cycle.

ResEstTime is characteristic of a particular resonant system and will vary particularly with transformer primary inductance. This is beneficial because a larger winding inductance generally allows longer on-time within core limitations, other conditions being similar. When choosing parameters for a converter, it is necessary to take into account transformer construction limitations, Switch voltage limit and other issues such as operating frequency (to avoid audible noise). Higher inductance allows longer on-time, which is in accordance with core flux limitation. Lower resonating capacitance leads to shorter on-time, which reduces core energy so that peak switch voltage is limited despite reduced capacitance.

It is therefore preferable for the converter to use a maximum on-time derived from the measured ResEstTime, as this will track variations in the inductance and resonating capacitance of the RDFC.

The choice of component parameters also predetermines the operating frequency range for a particular design. Hence it is possible to predict the operation of the system (frequency, on-time, off-time, maximum switch voltage, maximum core flux etc.). This allows the designer to choose appropriate values for the resonating components (capacitors and transformer primary) and for other transformer parameters.

The maximum on-time may be derived from the measured resonance time in a variety of ways, including:

Maximum on-time is proportional to resonance time, subject to maximum and/or minimum limits. The proportionality factor is preferably in the range 0.4 to 2. With lower values the core flux is reduced, higher values reduce conduction losses in windings, primary switch and output rectifier.

Maximum on-time is related to resonance time by a non-linear function, where the incremental increase of on-time with resonance time reduces as the resonance time increases. Where converters are working with high input voltages, it becomes more difficult to limit the peak resonance voltage to meet the limitations of the primary switch. Additionally, the peak core flux becomes higher with practical values of winding self-capacitance. Reducing the on-time assists with both of these restrictions.

The latter is complex and costly to implement so it is preferred that a proportionality constant of 0.6 to 1 is employed.

ResEstSig is an estimate of the resonant portion of the primary signal and is derived from the time between a first event associated with the switch being turned off and a second event associated with the resonant voltage reaching a first minimum. Preferably this is between turn-off of the switch and the first trailing edge of $S_f$ that coincides with the end of the resonant signal. ResEstTime is derived from ResEstSig and is an estimate of the resonance time.

To measure this reliably it is preferable that the turn-off time of the switch is short or predictable, so any delay in switching is small or can be corrected. Alternatively, the leading edge of $S_r$ may be used to mark the start of the resonance.

Following the start of the resonance time period, it is preferable to ignore or not detect any transitions in signal $S_f$ for a period $S_{f(a)}$. This prevents transitions in the early part of the resonance wave, such as shown in FIG. 7a, from registering as the true resonance.

Following the first rising transition of $S_f$, it is preferable to ignore or not detect (blank) subsequent transitions in $S_f$ for a period $S_{f(b)}$. This prevents the condition shown in FIG. 7b from causing errors. Further, the condition of "first transition" can be reset should a state of $S_r$=true subsequently be recognised. This avoids the possible problem where the condition of FIG. 7a is recognised, leading to a subsequent error if noise such as in FIG. 7b occurs in the same resonance.

The next falling edge of $S_f$ can then be used to indicate the end of the resonance for the purpose of resonance estimation.

To allow for a wide range of resonance timing, it is preferable to use times for $S_{f(a)}$ and $S_{f(b)}$ that vary with the measured ResEstTime, for example:

$S_{f(a)}$=¼ of ResEstTime $S_{f(b)}$=¹⁄₁₆ of ResEstTime

However, fixed times can be used for either or both.

Figure 8A:
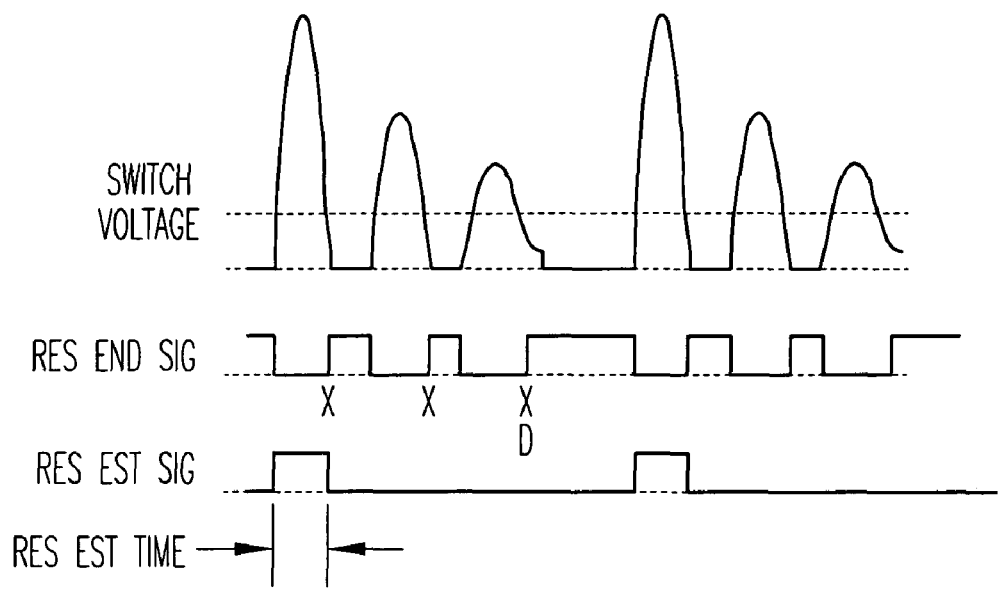
FIG. 8a shows a resonant signal where the off-time has been extended.
Figure 8B:
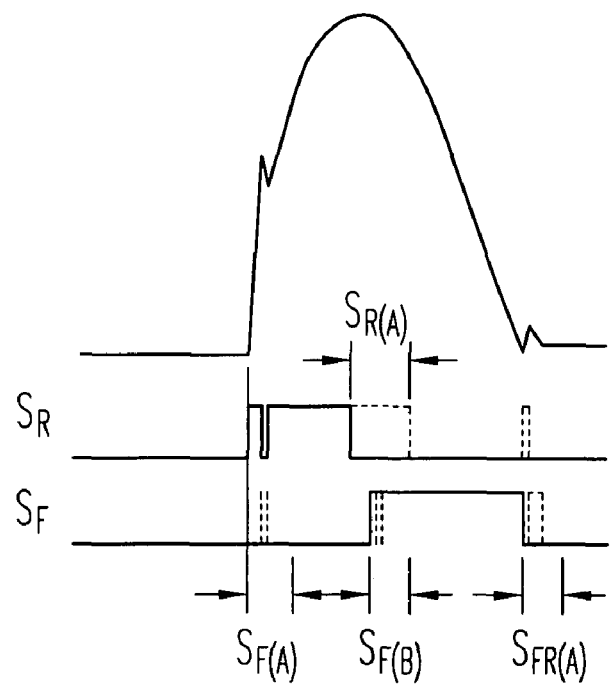
FIG. 8b illustrates extension and blanking periods of signals Sr and Sf.

FIG. 8b illustrates extension and blanking periods of signals Sr and Sf.

If times are used based on ResEstTime then it is desirable to start the system with an appropriate starting value for ResEstTime, otherwise the controller may fail to measure correctly due to excessively long or short blanking periods $S_{f(a)}$ or $S_{f(b)}$.

Alternatively, the controller may operate in a different mode or use fixed values until a suitable ResEstTime value has been measured, from which subsequent blanking periods $S_{f(a)}$ and $S_{f(b)}$ can be derived.

Further, it is preferable to manage the rate of change of ResEstTime to minimise the effects of noise.

There is a difficulty when the actual resonance time is longer than the off-time used for that particular cycle, in that the resonance cannot be observed to completion in order to calculate an appropriate calculated resonance time value. It is therefore preferable to infer the resonance in such circumstances.

A possible solution would be to monitor the resonating waveform and fitting a synthetic wave to it; the synthetic waveform then giving access to the theoretical resonance time. However, this is a complex calculation and difficult to perform at low cost.

A preferred, and simplified solution, would be to observe the resonance and determine simply if the resonance completes before or after the current estimate of resonance time. If the resonance completes before the current estimate, then the estimate can be reduced by a small amount. Conversely, if the resonance completes after the estimate, the estimate is increased.

Over a period of time, the resonance estimate will tend to track the actual resonance time, but with an averaging effect and some lag. This may be adequate in applications where the resonance time does not change quickly, but further optional techniques are preferred to handle dynamic conditions:

Start-up: measure the resonance of the first cycle (off-period) and use this value to set the initial resonance estimate Resonance very short: if the observed resonance is significantly shorter than the present estimate, either decrease the estimate more quickly (larger change), or set the estimate directly to the observed value Resonance very long: if the observed resonance is significantly longer than the present estimate, either increase the estimate more quickly (larger change), or set the estimate directly to the observed value Estimate in error for several cycles: if, for several cycles, the resonance is observed to be always late or always early in comparison to the estimate, then increase the rate of change of the estimate.

One strategy is to increment and decrement the assumed value for ResEstTime by predetermined amounts on each successive converter cycle. However this can give slow response or excessive change in competing conditions. Improved performance may be achieved by altering the rate of change of ResEstTime, for example:

If the measured time for resonance is very different from ResEstTime, adjust the value by a larger amount. Alternatively or additionally, the rate of change for increasing values may be less than the rate of change for decreasing values, to avoid core saturation problems If the measured time for resonance is lower than ResEstTime on a predetermined number of converter cycles, reduce ResEstTime faster. Alternatively or additionally, set its value directly to a measured time.

The second parameter that may be determined from the rising and failing signals $S_r$ and $S_f$ is the correct time to switch on the primary switch again after a previous on/off resonance.

As discussed above, it is preferably to turn the switch on only when the switch voltage is low or substantially minimised to avoid high EMI.

Preferably, the switch is turned on again at the earliest instant that the voltage is recognised as being low enough. Significant power is transferred to the output only when the switch is on, not simply when the voltage is low. Therefore, maximum power transfer and efficiency occurs when the switch to be turned on again as soon as possible.

However, for maximum efficiency at high load, it is preferable to operate with transformer core flux ranging from maximum of one polarity to maximum of the opposite. During the on-time, the flux ramps under influence of the applied primary voltage; it is preferable that the period of power transfer starts with the flux of maximum reverse polarity so that maximum on-time can be used. Maximum reverse core flux occurs approximately when the rate of change of switch voltage is maximum negative.

The latter moment (for maximum efficiency at high loads) occurs shortly before the former (for optimum power transfer), so there is a trade-off of EMI and efficiency. Where the resonance is strong and the switch voltage is substantially minimised (FIG. 3a), the difference is small and time "B" is an acceptable compromise.

When power transfer is deliberately reduced by extending the off-time, the primary objective is then to minimise EMI generated by turn-on. Referring to FIG. 8a, Signal ResEndSig represents the periods when it is undesirable to turn on the switch following the previous cycle. Depending on the desired reduction of power transfer, the following cycle of converter operation (primary switch turn-on) may be chosen to be any of the points marked X, i.e. skipping intermediate resonance cycles. Note that point D is in response to the reduced rate of change of voltage across the switch.

The ResEndSig may be derived from a logic NOR operation of signals derived from $S_r$ and $S_f$ as described below.

First, following the start of the resonance, it is preferable to ignore or not detect any transitions in signal $S_f$ for a period $S_{f(a)}$. This prevents transitions in the early part of the resonance wave, such as shown in FIG. 7a, from registering as the true resonance.

To overcome the condition shown in FIG. 7b, the true state of signal $S_r$ is extended beyond the end of the rising period of the primary signal by a period of $S_{r(a)}$. This ensures the true state of $S_r$ extends until after the true state of $S_f$ is established.

At the end of the resonant portion, signals $S_f$ and $S_r$ are blanked (forced to false) for a period $S_{fr(a)}$. This prevents the condition of FIG. 7c from preventing turn-on during the low level oscillations.

ResEndSig may then be derived from a logic NOR operation of the processed $S_r$ and $S_f$ signals.

To allow for a wide range of resonance timing, it is preferable to use times for $S_{fr(a)}$ and $S_{r(a)}$ that vary with the measured ResEstTime, for example:

$S_{r(a)} = 3/8$ of ResEstTime $S_{fr(a)} = 1/16$ of ResEstTime

However, fixed times may be used for either or both.

FIG. 8b illustrates extension and blanking periods of signals $S_r$ and $S_f$.

As described previously, detecting the end of the resonance can be used both to:

Trigger the next on-period for maximum power transfer with minimised losses and EMI Calculate an appropriate time to use for the maximum on-period The latter preferably uses the duration of the first resonance wave after the switch is turned off (to point B in FIG. 3a). It may be timed either from the rise of switch voltage, or some other signal associated with switch-off. In conditions where power transfer is reduced by extending the off-period, the former is determined by points where the switch voltage is at a minimum (points X in FIG. 8a), and requires that turn-on is inhibited by the rising portion of the resonant wave.

However, it is possible to operate without sensing the rising portion of the resonant wave. In these circumstances, the converter does not operate with extended off-period or, if it does, the phasing of turn-on ignores subsequent resonances. Using only a falling detector it is possible to determine the critical time at which the first resonance ends at a minimum voltage (C in FIG. 7d).

Figure 7D:
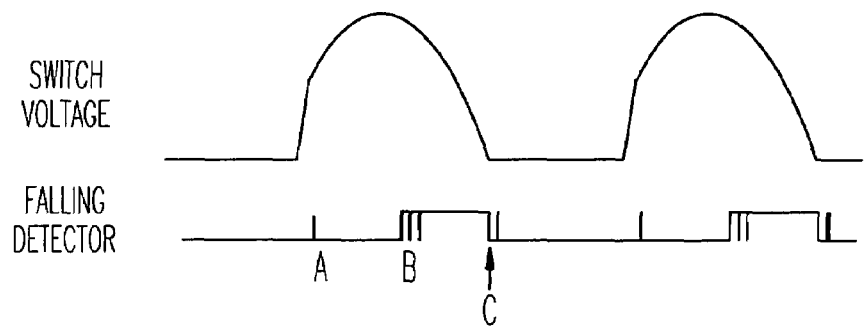

FIG. 7d shows an example waveform using only a falling detector.

Preferably, the falling signal will return to false only at C but difficulties arise in avoiding confusion caused by other possible transitions (e.g. at A and B as described previously). Using only a falling detector, it is more difficult to avoid this confusion reliably, and may restrict the range of component characteristics and circuit conditions that the system can tolerate. For example, transitions A and B could be blanked for fixed durations or durations calculated from the estimated resonance time. However, without a signal representing the rising portion of the wave it may not be possible to distinguish between conditions A and B. Hence, the leading edge blanking (intended for B) may be triggered prematurely by transition A. This then would give a risk of erroneous triggering of the next on-period at B. Improvements to this can be envisaged, for example the leading edge blanking could be "re-armed" if the rising signal was false for a time greater than a threshold, but this would restrict the timing range of resonant waves that the system could tolerate.

In conditions where the resonance is of large amplitude compared to the input supply voltage, the resonant wave returns close to 0V and is limited by conduction of the output diode or parasitic diode of the switch transistor (See FIG. 3a). The abrupt change of slope (rate of change with time) is detected by the falling detector and may be used to turn the switch on again at this time. However, when resonance is less strong, for example when the on-time has been shortened to limit power delivery, the resonance may not be limited in this way.

Figure 7E:
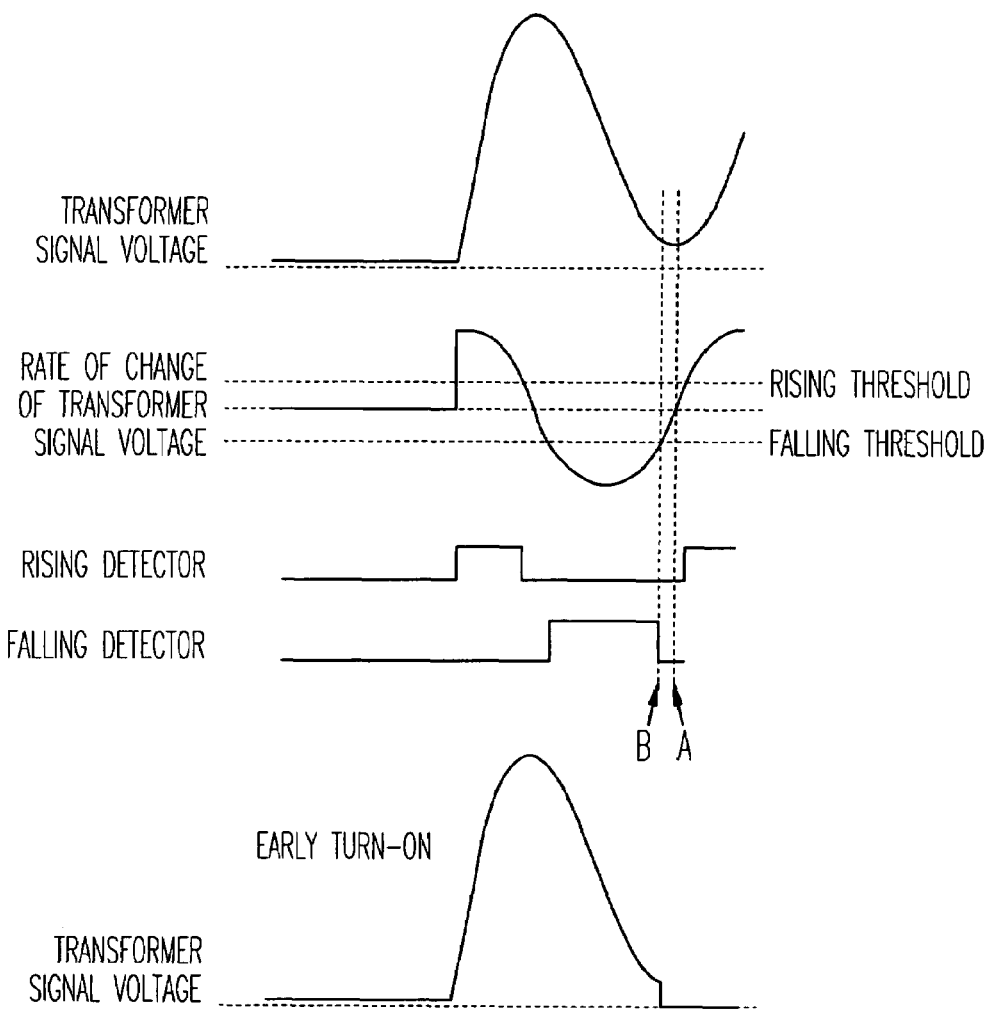

FIG. 7e illustrates a less strong resonance. There is a minimum of the resonance at time "A". However, the trailing edge of the falling detector may occur a short time before this, at point "B". This time depends on the effective rate of change threshold used in the falling detector. This time advance may be advantageous in situations where there is a delay inherent in turn-on of the switch; the rate-of-change threshold may be chosen so the actual point of turn on is close to the voltage minimum than otherwise would be the case. In applications where it is desired to use the maximum flux change acceptable for the transformer it is advantageous to turn on the switch early because this corresponds to negative core flux of large magnitude. By turning on early, the flux change due to a given on-time results in a lower peak positive flux. This condition may be achieved again by setting a higher magnitude for rate of change threshold of the falling detector. A consequence is that the switch will turn on at a time earlier than minimum voltage, which will cause some increase in turn-on power loss and interference generated. However, these may be acceptable given the greater use made of the available flux range. This switching behaviour is illustrated in FIG. 7e.

As discussed above, it is preferable for the controller to have a number of operational modes to enable the controller to manage the power transfer in differing loading conditions of the RDFC.

In particular, it is preferable for the system to respond appropriately in transient conditions, which may be caused by, for example, supply-line frequency ripple voltage superimposed on the supply voltage, load transients (no load/load/no load for example), start-up, and instability within the RDFC controller itself.

A preferred power management technique has the following operating modes.

"Standby B" (Low power): minimum on-time and extended off-time

"Standby A" (Low/medium power): variable on-time and resonant off-time

"Normal" (Medium/high power): maximum on-time and resonant off-time

"Overload" (High power): on-time shortened according to trigger of over-current protection by the instantaneous primary switch current, resonant (or minimum) off-time "Foldback" (Limited power): on-time shortened as for Overload, off-time extended to reduce power and current "Burst" (short-term maximum power): As overload, but applied for a fixed duration (or number of cycles) to provide robust start-up Preferably, change of mode is performed on the basis of the measured primary switch current and its rate of rise, but a further choice is the rate at which the controlled parameters (on-time and off-time) are changed in response to the measured current. If the controlled parameters change slowly then the system will also respond slowly to changing conditions, possibly leading to undesirable voltage excursions.

For example, consider the case of a load suddenly increasing from a low level to a high level. When the load is low, the controller will reduce the converter duty to minimise power consumption but when the load increases, the converter output voltage will dip before the controller increases the duty to sustain the load. For some loads this may be unacceptable. Typically, the converter includes a significant capacitance connected in parallel with the load to provide some reservoir to smooth the effects of load transients. However, this may not be sufficient within the time it takes for the converter parameters to respond to changing load conditions. Preferably, the controller parameters change relatively quickly so the size and cost of the reservoir capacitance can be minimised.

When the parameters (on-time and any extension to off-time) change quickly it is important to manage the changes to avoid other undesirable effects such as excessive on-time leading to high core flux and, in extreme, saturation, and excessive voltage during resonance causing damage to insulation.

Figure 9:
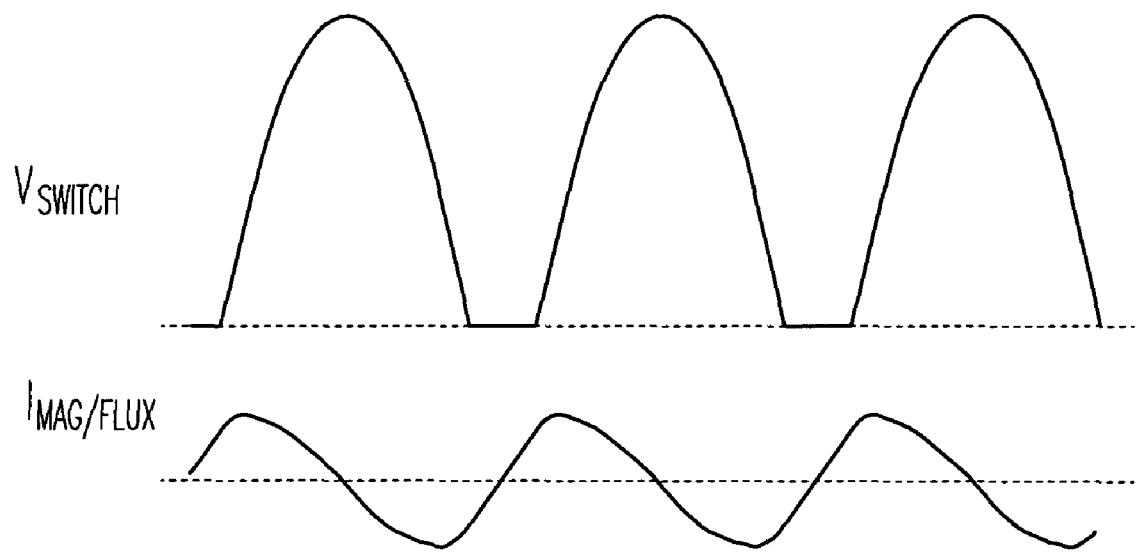
FIG. 9 shows the switch voltage and flux of the transformer signals.

For example, consider the case where the load increases from zero to some high level. At zero load, the converter will adapt to operate at short on-time and extended off-time. When the load is applied, the controller responds by decreasing the off-time (standby B) and increasing the on-time (standby A). In Standby A, at the start of the on-time the core flux is the result of resonance from the previous converter cycle. Given optimum resonance timing, this flux is approximately the same value (but opposite sign) as at the end of the previous on-time (see FIG. 9). If on-time is long, then the flux has a high peak-to-peak range and is typically arranged to be just within the capabilities of the core material. However, if the on-time was to suddenly increase from a low value to a high value then during the first long on-time period, the flux will be required to change from a low value at the beginning of the on-period to a very high value at the end. This value way be outside the capabilities of the core and will cause saturation with undesirable consequences.

Preferably, either the design is implemented so that the available range of core flux is underused in high-duty continuous operation, or the rate of increase of on-time is limited.

To minimise size and cost of power converters, it is preferable to use the maximum available range of flux in the transformer core, limited by the characteristics of the core material. In resonant operation, there may be a "negative" flux in the core at the beginning of the on-period of the power switch. During the on-period, the core flux increases (tends to more positive) and reaches a maximum approximately at the end of the on-period.

On-period is a primary means of control of power delivery, enabling reduction of power in response to light load or overload. In a particular design of power converter it is necessary to manage the on-period to ensure that a large, but not excessive, flux range is used. In resonant converters, the negative flux at the beginning of the on-period may be significant in reducing the peak positive flux at the end of the period. This can cause difficulties when the on-period or off period are changed, because both affect the negative flux at the beginning of the on-period.

If the on-period is increased in one converter cycle compared to the previous, the negative flux at the beginning of the on-period may be insufficient to limit the flux at the end to an acceptable level. To avoid this problem, it is preferable to limit the rate of increase of in-period between successive cycles. The increase between cycles may be simply at a fixed predetermined rate or, preferably, at a rate determined from the maximum on-period (itself may be determined from the estimated resonance time), such as a fraction of the maximum on-period.

Changes to the off-period affect the negative core flux at the beginning of the next cycle in complex ways. Firstly, the flux oscillates due to the resonant behaviour and secondly, it tends to decay as a result of circuit losses. As described elsewhere, to manage power delivery it is preferable to reduce the on-period before increasing the off-period. In these circumstances, there is no risk of excessive core flux provided the on-period is reduced to a relatively low value before the off-period is increased.

Example circumstances when the on-time may be required to increase include: increasing duty due to need for higher power delivery; recovery from overload (previously, on-time may have been limited by over current protection); and start-up.

In all such circumstances, it is preferred that the on-time increase is limited on a cycle-by-cycle basis.

The control techniques described here may be embodied in a system at low cost with few components. Preferably, an integrated controller device works with a low-cost power bipolar transistor to make an off-line power converter with several commercial advantages, including: high power capability despite small and low-cost components; use of bipolar power switch transistor rather than the higher-cost alternative of power mosfet or IGBT; compact size; low power loss in low/no-load conditions; and high conversion efficiency.

Figure 10:
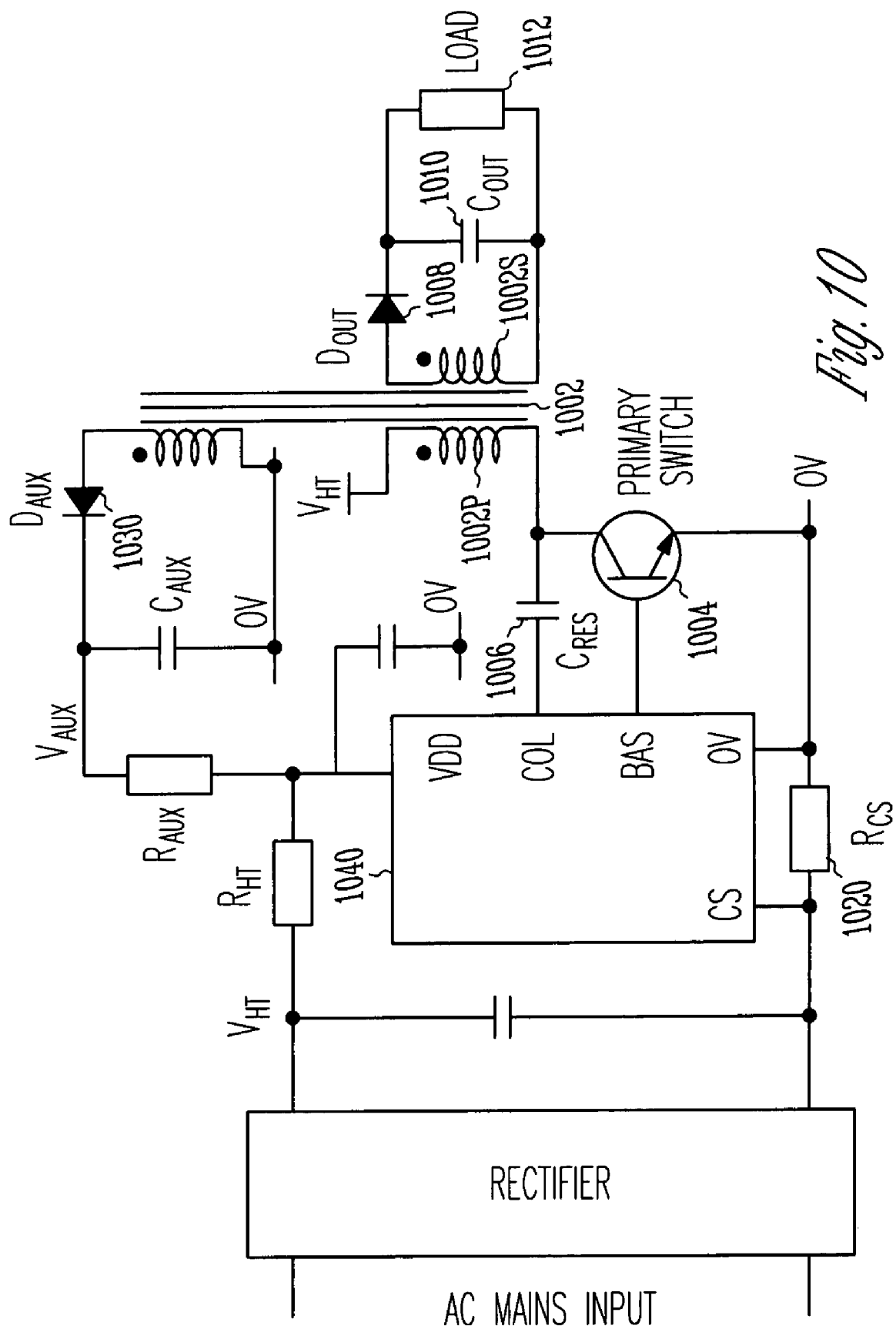
FIG. 10 shows an example RDFC according to the present invention.

FIG. 10 shows an example RDFC 1000 with such a controller. The RDFC comprises an insulating transformer 1002 having a primary $1002_P$ and secondary $1002_S$ windings. A switch 1004, when closed, applies a DC voltage $V_{ht}$ across a primary winding of the transformer. Power is delivered to the load 1012 via a rectifying diode 1008 and smoothing capacitor 1010. The polarity of the transformer is such that power is supplied to the output circuit when the primary switch is closed.

The RDFC further comprises an RDFC controller 1040. The controller preferably includes both analog and digital circuits to implement the above-mentioned control functions in accordance with the present invention. Preferably, the controller is fabricated in a low-cost conventional CMOS process.

The controller 1040 is AC coupled to the primary winding of the transformer to sense a primary signal via a resonance capacitor 1006, which also acts as the resonance capacitor for the RDFC. It is particularly advantageous for the capacitor to serve both functions, high voltages typically occur during converter operation and capacitors capable of withstanding them are expensive. Alternatively, two or more capacitors could be employed, one to couple signal to the controller and the other to supplement the resonance. This may be necessary in high power converters where the resonant current is high and unsuitable for applying in its entirety to the controller input. Optionally, the resonance may be coupled to the controller from a winding of the transformer other than the primary winding, the auxiliary winding for example. Furthermore, the primary switch current is sensed by a single resistor $R_{cs}$ 1020.

The controller is configured to provide a drive signal to the primary switch in response to the above-sensed signals.

Auxiliary power for the controller device and for base current to the primary switch is derived from an additional winding on the converter transformer, shown in this instance operating in a forward mode. This mode is preferred as it minimises the range of auxiliary voltage $V_{aux}$ under conditions of varying duty cycle and load.

High loads (reduced or zero output voltage) tend to reduce $V_{aux}$ via the transformer action. Therefore, it is preferred to include a shunt-mode voltage regulator in the controller device and supply via a resistor ($R_{aux}$) from $V_{aux}$ to avoid malfunction of the controller. In this way, an accurate controller supply voltage can be provided despite changes in input voltage and load conditions.

However, a wide range of $V_{aux}$ can still lead to high power dissipation, which is undesired, especially in no/low-load conditions. Preferably, the effect of load on $V_{aux}$ is minimised by the construction of the transformer. For example, the winding sequence can be constructed as: (from core outwards): Auxiliary, Primary and then Secondary. Furthermore, the secondary winding leakage inductance can be increased by winding over a reduced length of core, in comparison to the width of the primary and auxiliary windings.

To enable the controller to start up correctly from an unpowered state, power is preferably taken from the rectified high voltage supply via high value resistor $R_{hr}$.

In the description of resonance detection by rising and falling detectors, it has been assumed that the polarities are such that the resonant switch voltage waveform is positive after turnoff and that the rising and falling detectors sense the corresponding polarities. Other configurations are possible. For example, the circuit may use a supply of opposite polarity or the switch may be interposed elsewhere in the primary circuit with the effect that the resonance is negative instead or positive.

In such a case, the "Rising" signal would be configured to detect periods when the resonant voltage is falling (i.e. becoming more negative) and the "Falling" signal would be configured to detect periods when the resonant voltage is rising (i.e. becoming more positively). Obviously, also, the rising and falling signals may be of the opposite logical polarity and the subsequent processing adapted accordingly.

Figure 11A:
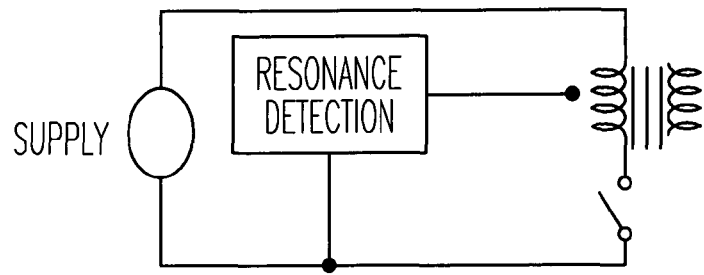
FIGS. 11a, 11b and 11c show alternative connection schemes of a resonance detector.
Figure 11B:
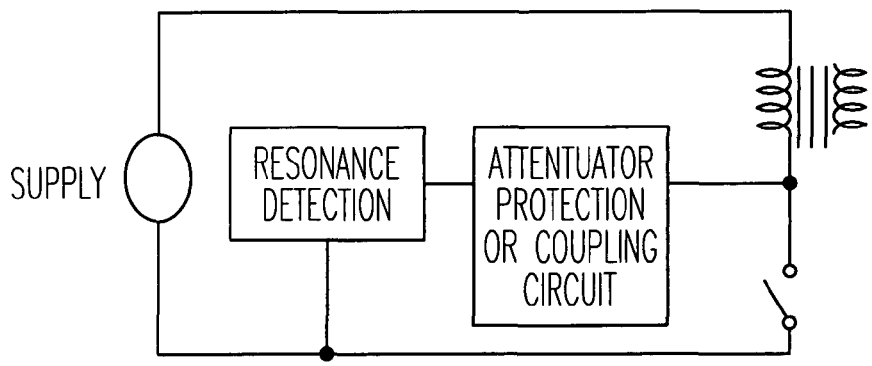
Figure 11C:
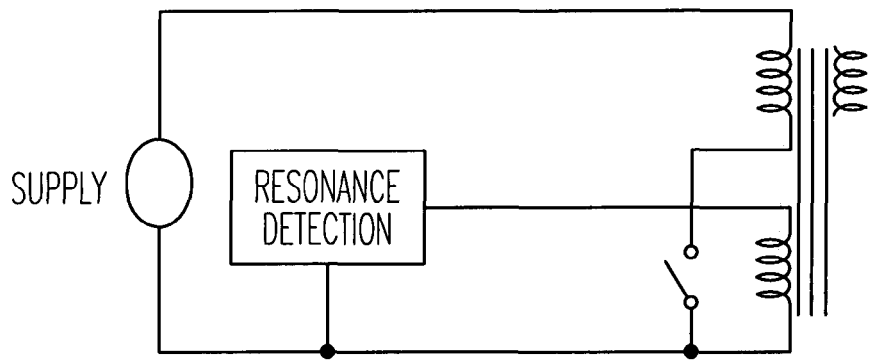

Further, it is not essential that the detectors operate directly from the switch voltage, they may use a variety of signals from the transformer or associated circuits, as shown in FIGS. 11a, 11b and 11c.

The above-described embodiments comprise resonance detection using capacitively-coupled rising and falling detectors with thresholds. These embodiments have advantages including simplicity, low power loss and economic implementation in the context of RDFCs. However there is a risk that the peak of the resonant wave may be mistaken for the end of the resonance wave (period Tg in FIG. 6).

During interval Tg, both rising and falling detectors indicate that the resonant voltage has a low rate of change. This condition is used to and the end of resonance, but clearly confusion can arise. A method to avoid this confusion derives an additional signal from the current through the coupling capacitor (C2 in FIG. 3). Ideally, the current through C2 is integrated to reconstruct a scaled approximation of the resonant wave. However, such integration can be difficult or expensive to implement in a low-cost integrated circuit controller. However, to avoid misinterpreting period Tg, it is not necessary to use accurate integration. All that is required is to detect whether the resonant wave is at a substantially high voltage or not. A variety of methods may be used to do this, including:

Derive a signal proportional to the current in C2 then pass this through a low-pass filter.

Use approximate integration techniques. For example, apply the C2 current, or a current representing it, to a capacitor and reset the capacitor each time its voltage exceeds either a high or a low threshold then repeat. When the high threshold is exceeded, increment a counter, when the low threshold is exceeded decrement the counter. The counter value then approximately represents the resonance voltage.

Alternatively, increment and decrement the counter if the C2 current is above a positive threshold or below a negative threshold.

Figure 12:
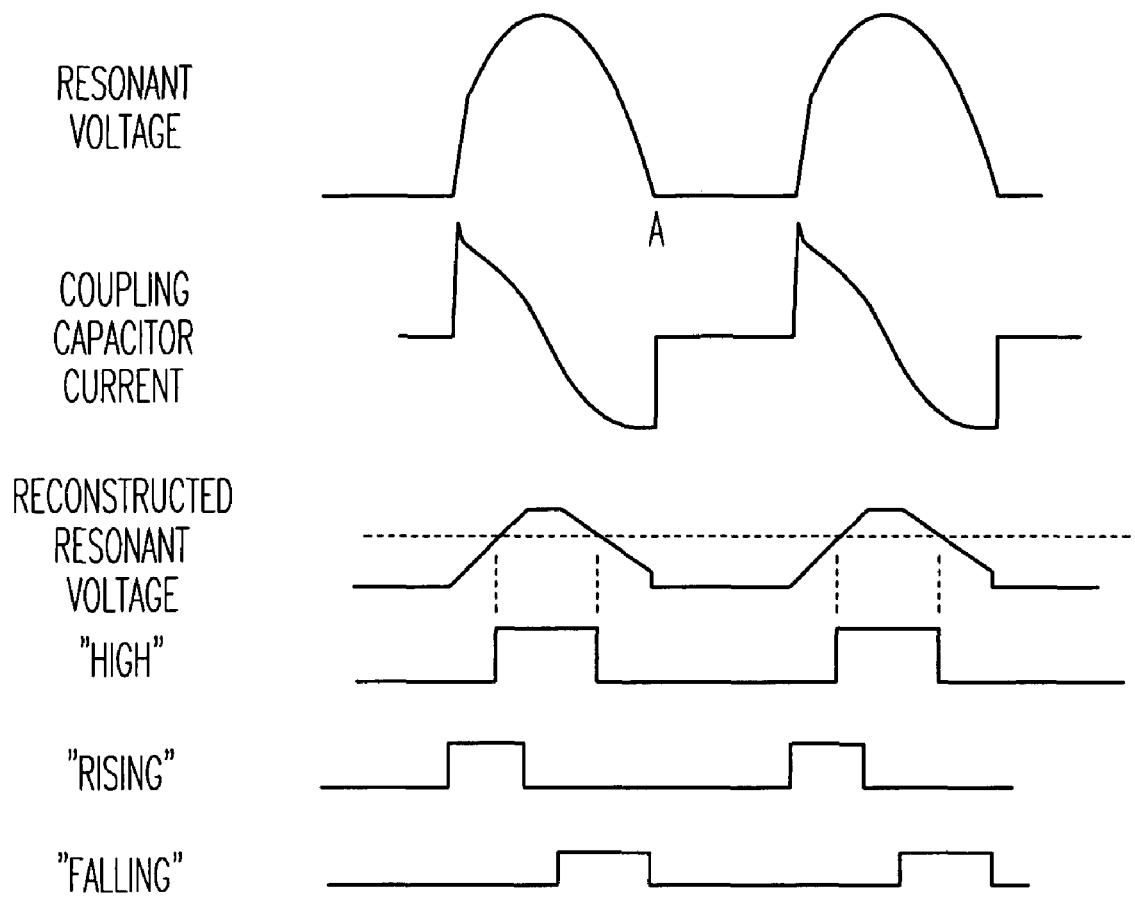
FIG. 12 shows example signals obtained from an RDFC using an alternative method.

Once such a signal representing the resonance has been obtained, it may then be thresholded to give another gating signal ("high") that may be used in combination with the falling and/or rising signals. Examples are shown in FIG. 12.

Signal "high" then may be combined logically with Rising and Falling to identify the resonant period with greater reliability.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A controller for a resonant discontinuous forward converter (RDFC), said converter including a transformer with a core and primary and secondary matched polarity windings and a switch to, in operation, cyclically switch DC power to said primary winding of said transformer, said converter arranged to resonate on a primary side of said converter to reset flux of said core each time said switch is off during each cycle of said DC power switching, said converter further having a DC output coupled to said secondary winding of said converter, said controller having a primary sense input to sense a primary winding signal, said primary winding signal representing a voltage across said primary winding or across an additional winding coupled to said primary winding, and wherein said controller is configured to switch on said switch in response to detection of a reduction in a rate of change of said primary winding signal below a threshold, adjacent a substantially minimum value in an operational cycle of said sensed primary winding signal to convey power to said DC output;

said primary sense input arranged to couple to said primary or additional winding via a capacitor to sense said primary winding signal, and the controller comprises a circuit for controlling said switch in response to said resonance of said RDFC, said circuit arranged to receive at said input current from said capacitor and having said input arranged to have an impedance such that said current received at said input is substantially proportional to said rate of change of said primary winding signal when said switch is on and when said switch is off and arranged to output signals for controlling switching on and off of said switch on the basis of said received current, said signals comprising a first signal representing a rising primary winding signal and a second signal representing a falling primary winding signal.

2. A controller according to claim 1, wherein said controller comprising a rate of change detector to detect said rate of change reduction, said rate of change detector comprising:

a trailing portion detector configured to output a trailing portion signal representing a period of said sensed primary winding signal during which said sensed primary winding signal has a first rate of change whose magnitude is greater than a first threshold value; and wherein said rate of change detector is configured to output a switch enable signal representing a period after said trailing portion signal in which said sensed primary winding signal is adjacent a minimum value.

3. A controller according claim 1, wherein said controller comprises a resonance period detector for determining a resonance period of said RDFC from said sensed primary winding signal, said resonance period detector determining a maximum on duration for said switch, said resonance period detector comprising:

a first event detector configured to detect a first event associated with said switch being switched off;

a second event detector configured to detect a second later event following said switch being switched off;

wherein said resonance period detector is configured to output a signal representing a duration between said first event and said second event.

4. A controller according to claim 1, wherein said controller is configured to control one or both of an on and off duration of said switch in response to a loading condition of said RDFC.

5. A resonant discontinuous forward power converter (RDFC) comprising a controller according to claim 1.

6. A controller according to claim 2, wherein said rate of change detector comprises:

a leading portion detector configured to output a leading portion signal representing a period of said sensed primary winding signal during which said sensed primary winding signal has a second rate of change that is greater than a second threshold value;

wherein said rate of change detector is configured to output a switch enable signal representing a period after said trailing portion signal and a following leading portion signal in which said sensed primary winding signal is adjacent a minimum value.

7. A controller according to claim 2, wherein said controller is configured to disable said trailing portion signal for an extension period substantially immediately following said period during which said first rate of change is greater than said first threshold value.

8. A controller according to claim 2 wherein said controller is configured to not detect transitions in said trailing portion signal for a first period substantially immediately following a first event associated with said switch being switched off, and wherein said first period is dependent on a resonance period of said RDFC.

9. A controller according to claim 2, wherein said controller is configured to not detect transitions in said trailing portion signal for a second period substantially immediately following said period during which said first rate of change of said sensed primary winding signal is greater than said first threshold value, said second period being dependent on a resonance period of said RDFC.

10. A controller according to claim 6, wherein said controller is configured to hold said leading portion signal at a value said leading portion signal has during said period when said second rate of change is greater than said second threshold value for a period extending beyond a time when said second rate of change has fallen below said second threshold value.

11. A controller according to claim 6, wherein said controller is configured to disable said leading portion signal for an extension period substantially immediately following said period during which said second rate of change is greater than said second threshold value.

12. A controller according to claim 10 wherein an extension of a said trailing portion signal is dependent on a resonance period of the RDFC.

13. A controller according to claim 12, wherein said resonance period determines a maximum on-duration of said switch.

14. A controller according to claim 11 wherein an extension of a said leading portion signal is dependent on a resonance period of the RDFC.

15. A controller according to claim 7 wherein an extension of a said trailing portion signal is dependent on a resonance period of the RDFC.

16. A controller according to claim 9, wherein said resonance period determines a maximum on-duration of said switch.

17. A controller according to claim 3 wherein said first event comprises an edge of a signal representing said switch being turned off.

18. A controller according to claim 3, wherein said first event comprises a start of a leading portion signal, said leading portion signal representing a period of said sensed primary winding signal during which a rate of change of said sensed primary winding signal is greater than a second threshold value.

19. A controller according to claim 3, wherein said second event comprises an end of a trailing portion signal, said trailing portion signal representing a period of said sensed primary winding signal during which a rate of change of said sensed primary winding signal is greater than a first threshold value.

20. A controller according to claim 19, wherein said controller is configured to not detect transitions in said trailing portion signal for a first period substantially immediately following said first event, and wherein said first period is dependent on a resonance period of said RDFC.

21. A controller according to claim 19, wherein said controller is configured to not detect transitions in said trailing portion signal for a second period substantially immediately following said period during which said rate of change of said sensed primary winding signal is greater than said first threshold value, said second period being dependent on a resonance period of said RDFC.

22. A controller according to claim 4, wherein said capacitor supports a resonant operation of said RDFC.

23. A method of controlling a resonant discontinuous forward converter (RDFC), said converter including:
a transformer with a core and primary and secondary matched polarity windings and a switch to in operation, cyclically switch DC power to said primary winding of said transformer, said converter arranged to resonate on a primary side of said converter to reset flux of said core each time said switch is off during each cycle of said DC power switching, said converter further having a DC output coupled to said secondary winding of said converter, said method comprising:
sensing a primary winding signal, said primary signal representing a voltage across said primary winding or across an additional winding coupled to said primary winding;
detecting a reduction in a rate of change of said primary winding signal below a threshold, adjacent a substantially minimum value in an operational cycle of said sensed primary winding signal; and
switching on said switch in response to said detection to convey power to said DC output, further comprising:
sensing a signal at a primary sense input coupled to said primary or additional winding via a capacitor to sense said primary winding signal; and
controlling said switch by a circuit in response to said resonance of said RDFC, said circuit receiving at said input current from said capacitor and having an impedance such that the current received at said input is substantially proportional to said rate of change of said primary winding signal when said switch is on and when said switch is off, and said circuit outputting signals for controlling switching on and off of said switch on the basis of said received current, said signals comprising a first signal representing rising primary winding signal and a second signal representing a falling primary winding signal.

24. A method according to claim 23, wherein said detecting comprises:
detecting a trailing portion of said sensed primary winding signal for a said operational cycle;
detecting a portion of said operation cycle of said sensed primary winding signal following said detected trailing portion of said sensed primary winding signal in which said sensed primary winding signal has a rate of change of said primary winding signal below a threshold, adjacent a substantially minimum value; and
generating a switch enable signal in response to said detection, said switch enable signal enabling switching on of said switch.

25. A method according to claim 23, further comprising determining a resonance period of said RDFC from said sensed primary winding signal, said resonance period determining a maximum on duration of said switch.

26. A method according to claim 23, wherein one or both of an on and off duration of said switch is controlled in response to a loading condition of said RDFC.

27. A method according to claim 24, wherein detecting said trailing portion of said sensed primary winding signal for a said operational cycle comprises:
comparing a rate of change of said primary winding signal against a first threshold value; and
generating a trailing portion signal that represents a period of said sensed primary winding signal during which said first rate of change of said sensed primary winding signal is greater than said first threshold value.

28. A method according to claim 24, wherein said detecting of a reduction in a rate of change of said primary winding signal below a threshold, adjacent a substantially minimum value of an operation cycle of said primary winding signal comprises:
detecting a leading portion of said sensed primary winding signal for a said operational cycle;
detecting a portion of said operation cycle of said sensed primary winding signal following said detected trailing portion and a following leading portion of said sensed primary winding signal in which said sensed primary winding signal has a rate of change of said primary winding signal below a threshold, adjacent a substantially minimum value.

29. A method according to claim 27, wherein said trailing portion signal is disabled for an extension period substantially immediately following said period during which said first rate of change is greater than said first threshold value.

30. A method according to claim 27, wherein transitions in said trailing portion signal are not detected for a first period substantially immediately following a first event associated with said switch being switched off, and wherein said first period is dependent on a resonance period of said RDFC.

31. A method according to claim 27, wherein transitions in said trailing period signal are not detected for a second period substantially immediately following said period during which said first rate of change of said sensed primary winding signal is greater than said first threshold value, said second period being dependent on a resonance period of said RDFC.

32. A method according to claim 29, wherein a length of said extension period is dependent on the resonance period of the RDFC.

33. A method according to claim 28 wherein detecting said leading portion of said sensed primary winding signal for a said operational cycle comprises:
comparing a rate of change of said sensed primary winding signal against a second threshold value; and
generating a leading portion signal that represents a period of said sensed primary winding signal during which said second rate of change of said sensed primary winding signal is greater than said second threshold value.

34. A method according to claim 33, wherein a value that said leading portion signal has during said period when said second rate of change is greater than said second threshold value is held at said value for a period extending beyond a time when said second rate of change has fallen below said threshold value.

35. A method according to claim 33, wherein said leading portion signal is disabled for an extension period substantially immediately following said period during which said second rate of change is greater than said second threshold value.

36. A method according to claim 35, wherein a length of said extension period is dependent on the resonance period of the RDFC.

37. A method according to claim 25, wherein said determining a resonance period of said RDFC from said sensed primary winding signal comprises:
detecting a first event associated with said switch being switched off detecting a second later event following said switch being switched off; and
generating a resonance period signal representing a duration between said first event and said second event.

38. A method according to claim 37, wherein said first event comprises an edge of a signal representing said switch being turned off.

39. A method according to claim 37, wherein said first event comprises a start of a leading portion, said leading portion representing a period of said sensed primary winding signal during which a second rate of change of said sensed primary winding signal is greater than a second threshold value.

40. A method according to claim 37, wherein said second event comprises an end of a trailing portion signal, said trailing portion signal representing a period of said sensed primary winding signal during which a first rate of change of said sensed primary winding signal is greater than a first threshold value.

41. A method according to claim 40, wherein transitions in said trailing portion signal are not detected for a first period substantially immediately following said first event, and wherein said first period is dependent on a resonance period of said RDFC.

42. A method according to claim 40, wherein transitions in said trailing portion signal are not detected for a second period substantially immediately following said period during which said rate of change of said sensed primary winding signal is greater than said first threshold value, and wherein said second period is dependent on a resonance period of said RDFC.

43. A method according to claim 26, wherein in a maximum power loading condition, said on duration is substantially maximised and said off duration is substantially minimised.

44. A method according to claim 26, wherein in a medium power loading condition, said on duration is reduced from a maximum on duration and said off duration is substantially minimised.

45. A method according to claim 26 wherein, in a low power loading condition, said on-duration is substantially minimised and an off duration is increased from a minimum duration.

46. A method of determining a resonance period of a resonant discontinuous forward converter (RDFC), said converter including a transformer with a core and primary and secondary matched polarity windings and a switch on a primary side of said converter to, in operation, cyclically switch DC power to said primary winding of said transformer, said converter arranged to resonate on a primary side of said converter to reset flux of said core each time said switch is off during each cycle of said DC power switching, said resonance period being of said primary side resonance, said converter further having a DC output coupled to said secondary winding of said converter, said controller having a primary sense input to sense a primary winding signal, said primary winding signal representing a voltage across said primary winding, or across an additional winding coupled to said primary winding, said method comprising:
  detecting a first event associated with said switch being switched off;
  detecting a second later event following said switching being switched off; and
  generating a resonance period signal representing a duration between said first event and said second event, wherein said resonance period determines a maximum on duration of said switch.

47. A method according to claim 46, wherein said first event comprises an edge of a signal representing said switch being turned off.

48. A method according to claim 46, wherein said first event comprises a start of a leading portion signal, said leading portion signal representing a period of said sensed primary winding signal during which a second rate of change of said sensed primary winding signal is greater than a second threshold value.

49. A method according to claim 46, wherein said second event comprises an end of a trailing portion signal, said trailing portion signal representing a period of said sensed primary winding signal during which a first rate of change of said sensed primary winding signal is greater than a first threshold value.

50. A method according to claim 49, wherein transitions in said falling signal are not detected for a first period substantially immediately following said first event, and wherein said first period is dependent on a resonance period of said RDFC.

51. A method according to claim 49, wherein transitions in said trailing portion signal are not detected for a second period substantially immediately following said first rate of change of said sensed primary winding signal being greater than said first threshold value, said second period being dependent on a resonance period of said RDFC.

52. A controller for a resonant discontinuous forward converter (RDFC), said converter including a transformer with a core and primary and secondary matched polarity windings and a switch to, in operation, cyclically switch DC power to said primary winding of said transformer, said converter arranged to resonate on a primary side of said converter to reset flux of said core each time said switch is off during each cycle of said DC power switching, said converter further having a DC output coupled to said secondary winding of said converter, said controller having:
  a primary sense input to sense a primary winding signal, said primary winding signal representing a voltage across said primary winding or across an additional winding coupled to said primary winding;
  means for detecting a first event associated with said switch being switched off;
  means for detecting a second later event following said switch being switched off;
  means for generating a resonance period signal representing a duration between said first event and said second event, and wherein said resonance period determines a maximum on duration of said switch, wherein said resonance period is of said primary side resonance.

53. A controller for a resonant discontinuous forward converter (RDFC), said converter including a transformer with a core and primary and secondary matched polarity windings and a switch to, in operation, cyclically switch DC power to said primary winding of said transformer, said converter arranged to resonate on a primary side of said converter to reset flux of said core each time said switch is off during each said cycle of said DC power switching, said converter further having a DC output coupled to said secondary winding of said converter, said controller comprising;
  a primary sense input to sense a primary winding signal, said primary winding signal representing a voltage across said primary winding or across an additional winding coupled to said primary winding;
  a rate of change detector to detect a rate of change reduction, said rate of change detector comprising:
  a falling signal detector configured to output a falling signal representing a period of said sensed primary winding signal during which said sensed primary winding signal has a first rate of change whose magnitude is greater than a first threshold value; and a rising signal detector configured to output a rising signal representing a period of said sensed primary winding signal during which said sensed primary winding signal has a second rate of change whose magnitude is greater than a second threshold value, wherein said rate of change detector is configured to output a switch enable signal representing a period after said falling signal and a following rising signal in which said sensed primary winding signal is adjacent a minimum value, and wherein said controller is configured to switch on said switch in response to detection of a reduction in a rate of change of said primary winding signal below a threshold, adjacent substantially minimum value in an operational cycle of said sensed primary winding signal to convey power to said DC output, said primary sense input arranged to couple to said primary or additional winding via a capacitor to sense said primary winding signal, and the controller comprises a circuit for controlling said switch in response to said resonance of said RDFC, said circuit arranged to receive at said input current from said capacitor and having said input arranged to have an impedance such that said current received at said input is substantially proportional to said rate of change of said primary winding signal when said switch is on and when said switch is off and arranged to output signals for controlling switching on and off of said switch on the basis of said received current, said signals comprising a first signal representing rising primary winding signal and a second signal representing a falling primary winding signal.

* * * * *